United States Patent
Xu et al.

(10) Patent No.: US 12,302,219 B2
(45) Date of Patent: *May 13, 2025

(54) BASE STATION ACCESS CONTROL TECHNIQUES FOR INACTIVE DIRECT TRANSMISSION

(71) Applicant: Apple Inc., Cupertino, CA (US)

(72) Inventors: Fangli Xu, Beijing (CN); Chunhai Yao, Beijing (CN); Dawei Zhang, Cupertino, CA (US); Haijing Hu, Cupertino, CA (US); Longda Xing, Cupertino, CA (US); Murtaza A. Shikari, Cupertino, CA (US); Sarma V. Vangala, Cupertino, CA (US); Srinivasan Nimmala, Cupertino, CA (US); Wei Zeng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/441,816

(22) PCT Filed: Aug. 6, 2020

(86) PCT No.: PCT/CN2020/107395
§ 371 (c)(1),
(2) Date: Sep. 22, 2021

(87) PCT Pub. No.: WO2022/027431
PCT Pub. Date: Feb. 10, 2022

(65) Prior Publication Data
US 2023/0156571 A1 May 18, 2023

(51) Int. Cl.
*H04W 48/06* (2009.01)
*H04W 76/27* (2018.01)
*H04W 76/19* (2018.01)

(52) U.S. Cl.
CPC ........... *H04W 48/06* (2013.01); *H04W 76/27* (2018.02)

(58) Field of Classification Search
CPC .............................. H04W 48/06; H04W 76/27
(Continued)

(56) References Cited

U.S. PATENT DOCUMENTS

2019/0349970 A1  11/2019  Chen
2019/0364600 A1  11/2019  Liu et al.
(Continued)

FOREIGN PATENT DOCUMENTS

CN      110169135 A     8/2019
CN      110291748 A     11/2019
(Continued)

OTHER PUBLICATIONS 63014648P (Year: 2020).*
(Continued)

*Primary Examiner* — Intekhaab A Siddiquee
(74) *Attorney, Agent, or Firm* — Eschweiler & Potashnik, LLC; Ningjiao Zhang

(57) ABSTRACT

A base station associated with a wireless communication system is disclosed. The base station comprises one or more processors configured to generate a service configuration signal to be provided to a user equipment (UE) associated therewith. In some embodiments, the service configuration signal comprises an indication of one or more service configurations associated with a data transmission that are allowed to be transmitted by the UE during an INACTIVE state of the UE. In some embodiments, the one or more processors is further configured to provide the service configuration signal to the UE.

20 Claims, 22 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2020/0045767 | A1* | 2/2020 | Velev | H04W 8/22 |
| 2020/0162995 | A1 | 5/2020 | Wei et al. | |
| 2021/0227575 | A1* | 7/2021 | Ou | H04W 72/23 |
| 2021/0337625 | A1* | 10/2021 | Tsai | H04W 76/19 |
| 2023/0120407 | A1 | 4/2023 | Huang | |
| 2023/0156847 | A1 | 5/2023 | Zhang | |
| 2023/0262815 | A1* | 8/2023 | Agiwal | H04W 74/0841 |

FOREIGN PATENT DOCUMENTS

| | | | | |
|---|---|---|---|---|
| CN | 110622608 | A | 12/2019 | |
| CN | 111132239 | A | 5/2020 | |
| CN | 111163498 | A | 5/2020 | |
| CN | 111194089 | A | 5/2020 | |
| WO | WO-2018014741 | A1 * | 1/2018 | H04W 72/04 |
| WO | 2018143631 | A1 | 9/2018 | |
| WO | WO-2019206089 | A1 * | 10/2019 | H04L 5/0053 |
| WO | 2020067749 | A1 | 4/2020 | |
| WO | 2020102685 | A1 | 5/2020 | |
| WO | WO-2021203252 | A1 * | 10/2021 | H04W 52/0216 |
| WO | 2022000488 | A1 | 1/2022 | |

OTHER PUBLICATIONS

R2-1700108 (Year: 2017).*
European Extended Search Report mailed Feb. 21, 2024 in connection with Application No. EP20948535.
3rd Generation Partnership Project; Technical Specification Group Services and System Aspects; Service requirements for the 5G system; Stage 1 (Release 17); 3GPP TS 22.261 V17.3.0; Jul. 2020.
LTE; Evolved Universal Terrestrial Radio Access (E-UTRA); Services provided by the physical layer; (3GPP TS 36.302 version 13.8.0 Release 13); ETSI TS 136 302 V13.8.0; Jul. 2020.
LTE; Evolved Universal Terrestrial Radio Access (E-UTRA); Services provided by the physical layer; (3GPP TS 36.302 version 14.6.0 Release 14); ETSI TS 136 302 V14.6.0; Jul. 2020.
LTE; Evolved Universal Terrestrial Radio Access (E-UTRA); Services provided by the physical layer; (3GPP TS 36.302 version 16.1.0 Release 16); ETSI TS 136 302 V16.1.0; Jul. 2020.
International Search Report Dated Apr. 12, 2021 for International Application PCT/CN2020/107395.
International Written Opinion Dated Apr. 12, 2021 for International Application PCT/CN2020/107395.
5G; "Non-Access-Stratum (NAS) protocol for 5G System (5GS)"; Stage 3 (3GPP TS 24.501 version 16.5.1 Release 16); ETSI TS 124 501 V16.5.1; Aug. 2020.
5G; "Non-Access Stratum (NAS) protocpol for 5G System (5GS)"; Stage 3 (3GPP TS 24.501 version 15.6.0 Release 15); ETSI TS 124 501 V15.6.0; Jan. 2020.
5G; "Service requirements for the 5G system"; (3GPP TS 22.261 version 16.12.0 Release 16); ETSI TS 122 261 V16.12.0; Aug. 2020.
5G; "Service requirements for next generation new services and markets"; (3GPP TS 22.261 version 15.8.0 Release 15); ETSI TS 122 261 V15.8.0; Oct. 2019.
ZTE Corporation; "Work Item on NR smalldata transmissions in Inactive state"; 3GPP TSG RAN Meeting #86; RP-193252; Dec. 9, 2019.
LTE Layers Data Flow; Tutorialspoint; Jul. 15, 2020.
3rd Generation Partnership Project Technical Specification Group; "Services and System Aspects; Study on architecture enhancements to support Proximity-based Services(ProSe)"; (Release 12); 3GPP TR 23.703 VI2.0.0; Mar. 10, 2014.
Techplayon; 5G NR RRC Procedure and its States; URL; http://www.techplayon.com/5g-nr-rrc-procedure-states/#:~:text=The%20different%20RRC%20states%20in,in%20a%20given%20specific%20state.&text=Appart%20form%20RRC%20connected%20and,names%20as%20RRC%20Inactive%20state; Sep. 14, 2021.
Ericsson; A guide to 5G network security insight report; URL; https://www.ericsson.com/en/security/a-guide-to-5g-network-security; Sep. 14, 2021.
How LTR Stuff Works; 5G NR; UE RRC States and State Transitions ; URL; http://howltestuffworks.blogspot.com/2019/09/5g-nr-ue-rc-states-and-state.html#:~:text=Once%20RRC%20connection%20is%20established,to%20reduce%20UE's%20power%20consumption; Sep. 14, 2021.
Learning LTE; Articles, updates on LTE from 3GPP standard specifications; URL; http://lte-epc.blogspot.com/2012/08/backoff-indicator.html#:~:text=Backoff%20Indicator%20is%20a%20special,it%20already%20sent%20a%20PRACH; Aug. 24, 2012.
Channels: physical, Logical and Transport; URL; https://www.electronics-notes.com/articles/connectivity/4g-lte-long-term-evolution/physical-logical-transport-data-channels.php#:~:text=LTE%20uses%20a%20series%20of,efficient%20management%20of%20the%20data; Sep. 14, 2021.
Nokia et al; "Aspects for direct data transmission in new NR state"; 3GPP TSG-RAN WG2; Meeting NR Ad Hoc R2-1700108 19; Jan. 19, 2017.
To become a LTE Expert; MAC PDU Formats; http://lteexpert.blogspot.com/2014/10/mac-pdu-formats.html; Sep. 14, 2021.
Ericsson; "Higher-layer aspects for Redcap"; 3GPP TSG-RAN WG1 Meeting #101-e; R1-2003292; May 25, 2020.
LTE Quick reference; Share Technote; https://www.sharetechnote.com/html/Handbook_LTE_MAC_CE.html#:~:text=These%20special%20MAC%20structure%20carrying,the%20details%20of%20MAC%20header); Sep. 14, 2021.
LTE; "Evolved Universal Terrestrial Radio Access (E-UTRA);" Services provided by the physical layer (3GPP TS 36.302 version 9.0.0 Release 9); ETSI TS 136 302 V9.0.0; Feb. 2010.
PCT Search Report dated Apr. 22, 2021 in connection with PCT Application No. PCT/CN2020/107508.
PCT Written Opinion dated Apr. 22, 2021 in connection with PCT Application No. PCT/CN2020/107508.
LTE; "Evolved Universal Terrestrial Radio Access (E-UTRA); Services provided by the physical layer"; (3GPP TS 36.302 version 15.3.0 Release 15); Jul. 2020.
U.S. Appl. No. 17/441,803, filed Sep. 21, 2021.
Non-Final Office Action dated Mar. 11, 2024, for U.S. Appl. No. 17/441,803.
5G; NR; NR and NG-RAN Overall description; Stage-2; (3GPP TS 38.300 version 15.10.0 Release 15); ETSI TS 138 300 V15.10.0; Jul. 2020.
5G; NR; NR and NG-RAN Overall description; Stage-2; (3GPP TS 38.300 version 16.2.0 Release 16); ETSI TS 138 300 V16.2.0; Jul. 2020.
5G; NR; Medium Access Control (MAC) protocol specification; (3GPP TS 38.321 version 15.9.0 Release 15); ETSI TS 138 321 V15.9.0; Jul. 2020.
5G; NR; Medium Access Control (MAC) protocol specification; (3GPP TS 38.321 version 16.1.0 Release 16); ETSI TS 138 321 V16.1.0; Jul. 2020.
5G; NR; Radio Resource Control (RRC); Protocol specification; (3GPP TS 38.331 version 15.10.0 Release 15); ETSI TS 138 331 V15.10.0; Jul. 2020.
5G; NR; Radio Resource Control (RRC); Protocol specification; (3GPP TS 38.331 version 16.1.0 Release 16); ETSI TS 138 331 V16.1.0; Jul. 2020.
Chinese Office Action dated Jul. 15, 2024, for Chinese Application No. 202080104288.0.
Nokia, "R2-1700108 Aspects for direct data transmission in new NR state", 3GPP tsg_ran\WG2_RL2, Jan. 5, 2017.
Final Office Action dated Oct. 23, 2024, for U.S. Appl. No. 17/441,803.
Chinese Office action dated Dec. 31, 2024 in connection with Application No. 202080104286.1.

(56) References Cited

OTHER PUBLICATIONS

United States Non Final Office Action dated Jan. 30, 2025 in connection with U.S. Appl. No. 17/441,803.

* cited by examiner

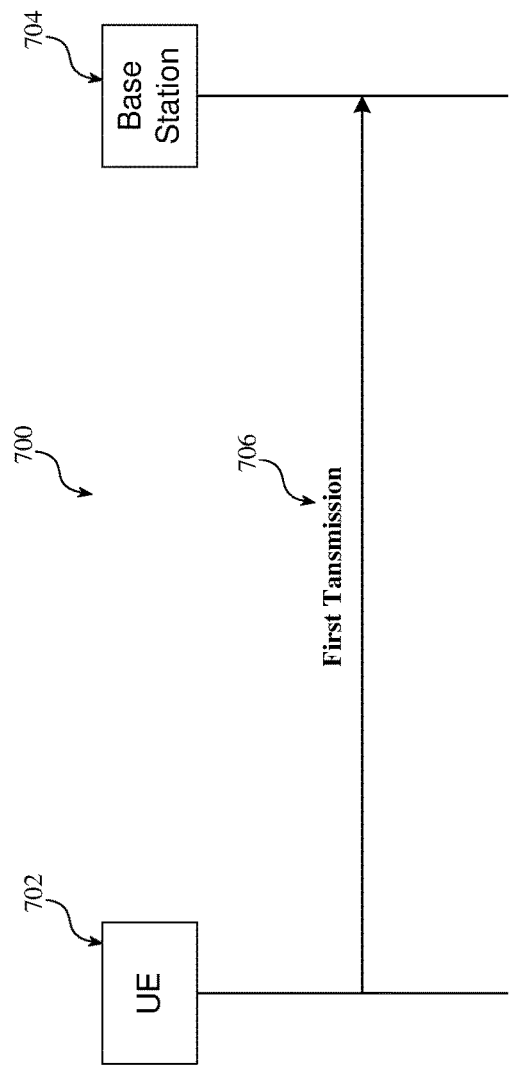
FIG. 7a
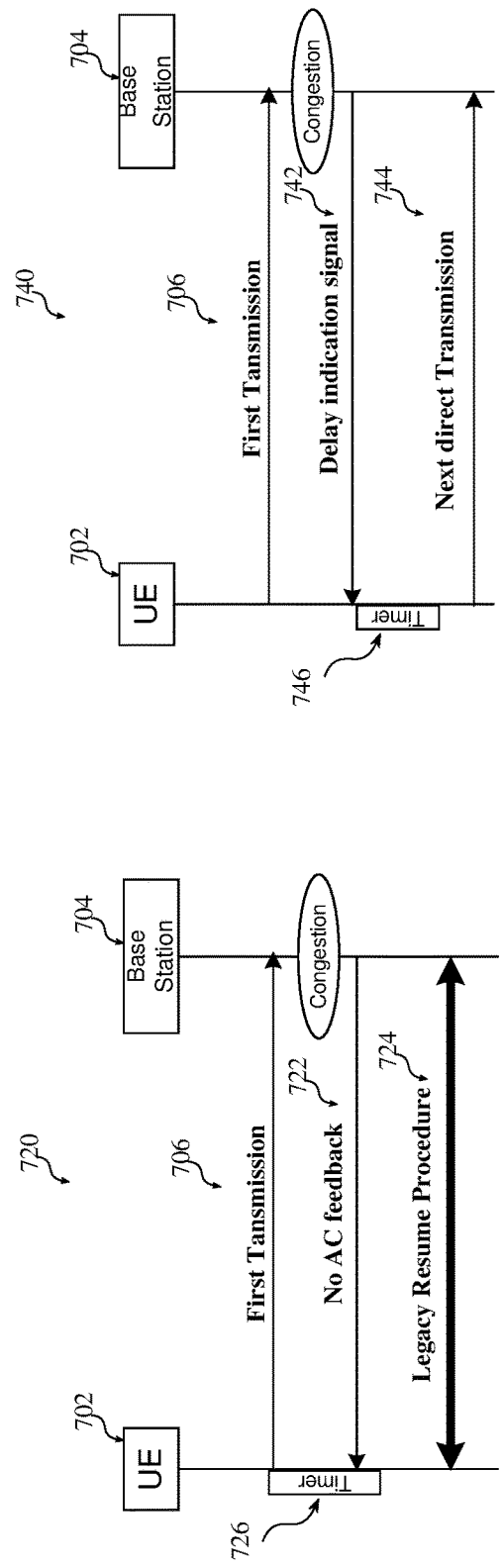
FIG. 7c
FIG. 7b

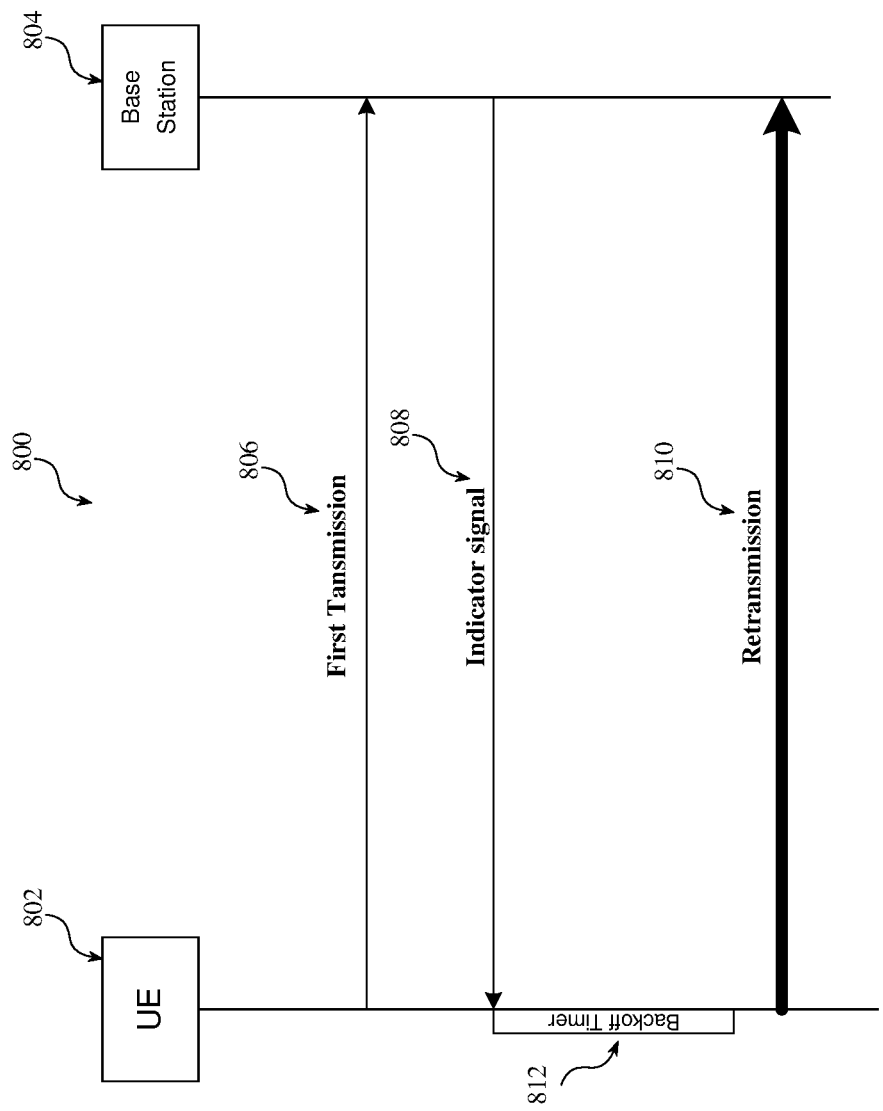

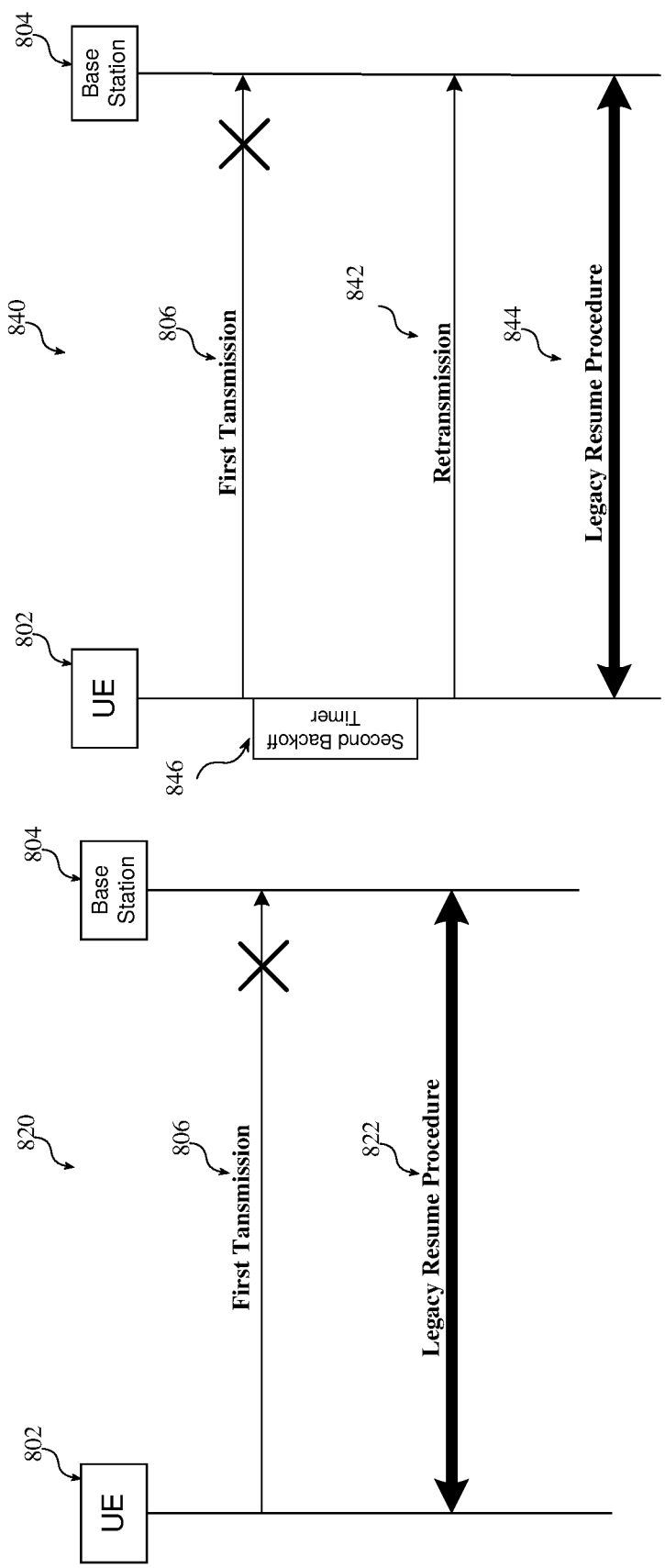

BASE STATION ACCESS CONTROL TECHNIQUES FOR INACTIVE DIRECT TRANSMISSION

REFERENCE TO RELATED APPLICATIONS

This application is a National Phase entry application of International Patent Application No. PCT/CN2020/107395 filed Aug. 6, 2020, entitled "BASE STATION ACCESS CONTROL TECHNIQUES FOR INACTIVE DIRECT TRANSMISSION", the contents of which are herein incorporated by reference in their entirety.

FIELD

The present disclosure relates to the field of wireless communication systems, and including a system and method for access control during inactive direct transmission.

BACKGROUND

When multiple UEs try to get access to a same cell, in some cases, the signal from different UEs interferes with each other and does not get decoded by the cell. Further, in some cases, these multiple UE access attempts create an overloading on the cell and network. Overload in a network is a condition in which an incoming load to the network is greater than the network's available resources to handle that load. Overload in the network may result in congestion occurrence, resource waste, Quality of Service (QoS) degradation and in the worst-case, it will cause service unavailability. Therefore, it is essential to control (limit) the amount of the UE access attempts to the network. Access control or Radio Access barring control refers to a traffic congestion control mechanism to secure and ensure the success of critical communications calls such as emergency calls by restricting connection requests from mobile to base station.

BRIEF DESCRIPTION OF THE DRAWINGS

Some examples of circuits, apparatuses and/or methods will be described in the following by way of example only. In this context, reference will be made to the accompanying Figures.

FIGS. 7a-7e illustrates simplified block diagrams of a wireless communication system that facilitates access control, according to another aspect of the disclosure.

FIGS. 8a-8d illustrates simplified block diagrams of a wireless communication system 800 that facilitates access control, according to yet another aspect of the disclosure.

DETAILED DESCRIPTION

Figure 1:
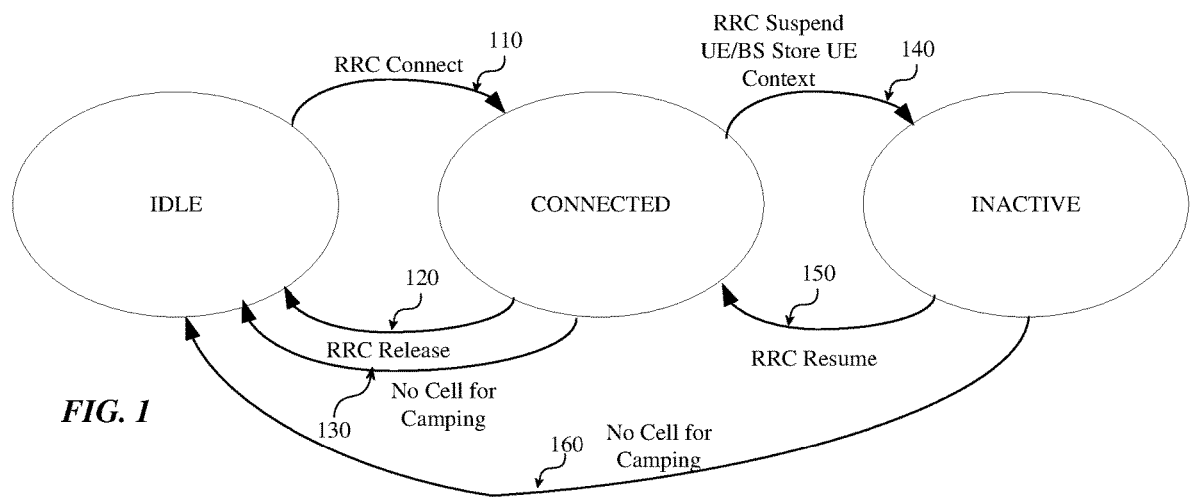
FIG. 1 is a state diagram illustrating the three radio resource control (RRC) states in which a UE may operate, according to the various aspects described herein.

In one aspect of the disclosure, a base station is disclosed. In one aspect, the base station may be associated with a new radio (NR) system. The base station comprises one or more processors configured to generate a service configuration signal to be provided to a UE associated therewith. In some embodiments, the service configuration signal comprises an indication of one or more service configurations associated with a data transmission that are allowed to be transmitted by the UE during an INACTIVE state of the UE. The one or more processors is further configured to provide the service configuration signal to the UE.

In one aspect of the disclosure, a method for a base station is disclosed. In one aspect, the base station may be associated with a new radio (NR) system. The method comprises receiving a first transmission associated with a direct transmission signal from a user equipment (UE) during an INACTIVE state of the UE, using one or more processors. In some embodiments, the first transmission comprises a first media access control (MAC) protocol data unit (PDU)

of the direct transmission signal. In some embodiments, the first MAC PDU comprises access control information comprising one or more access control parameters associated with the direct transmission signal. The method further comprises processing the first transmission associated with the direct transmission signal, using the one or more processors. Furthermore, the method comprises controlling subsequent direct transmissions from the UE in the INACTIVE state of the UE, using the one or more processors, based on the access control information within the first transmission or network conditions, or both.

In one aspect of the disclosure, an apparatus configured to be employed in a base station is disclosed. In one aspect, the base station may be associated with a new radio (NR) system. The apparatus comprises one or more processors configured to process one or more direct transmissions associated with a direct transmission signal from a user equipment (UE) during an INACTIVE state of the UE, and determine whether to allow a subsequent direct transmission from the UE in the INACTIVE state, based on network conditions. The one or more processors is further configured to provide a stop indication signal to the UE, when it is determined not to allow the subsequent direct transmission from the UE in the INACTIVE state. In some embodiments, the stop indication signal indicates the UE to start a stop timer having an associated stop time value during which any direct transmission from the UE in the INACTIVE state to the base station is to be stopped.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1 is a state diagram illustrating the three radio resource control (RRC) states in which a UE may operate. In the IDLE state, the UE is disconnected from the core network (CN). While in IDLE the UE performs cell re-selection and can receive paging messages from the CN by way of the cell on which the UE is camping. To enter the CONNECTED state, the UE performs an RRC Connect process 110 in which the UE uses the random access channel (RACH) process (described in more detail below) to connect to the CN and radio access network (RAN). In the CONNECTED state, the UE is connected to and registered with the CN. Control and User plane connections are established between the RAN and the CN for the UE. The RAN is aware of which cell the UE belongs to and all parameters necessary for unicast communication between the UE and RAN are known to both the UE and the RAN. A UE context that includes an access stratum (AS) context of the UE (e.g., the UE's cell radio network temporary identifier (C-RNTI), and Cell Identity of the Primary Cell) and an RRC configuration for the UE (e.g., radio bearer and security information) are stored in the RAN and also in the UE.

From the CONNECTED state, the UE may move back to the IDLE state by performing an RRC Release process 120. When the UE returns to the IDLE state, the UE context is deleted from the UE and the RAN. The UE may also enter the IDLE state by default from either the CONNECTED state or the INACTIVE state when a cell for camping cannot be found as indicated by 130, 160.

The INACTIVE state was introduced in 5G to provide an intermediate state between the IDLE and CONNECTED states that would expedite the re-connection process by eliminating some of the signaling used to transition from the IDLE state to the CONNECTED state. The INACTIVE state is beneficial for UEs that infrequently communicate with the RAN and allows for power saving as compared to these UEs remaining in the CONNECTED state. To enter the INACTIVE state, the UE performs an RRC Suspend process 140 in which the UE context is stored by both the UE and the serving gNB and then the RRC Release process occurs. In the INACTIVE state, the UE still has a non-access stratum (NAS) connection with the CN (i.e., is still in a connection management (CM)-CONNECTED state as opposed to the IDLE state in which the UE is not CM-CONNECTED).

While in the INACTIVE state, the UE may move within a RAN notification area (RNA) without notifying the RAN, perform cell re-selection, and receive paging messages from the RAN. However, the UE does not have dedicated AS resources for performing unicast communication and thus cannot perform any dedicated data transmission or reception. Since the UE cannot perform dedicated data reception while in INACTIVE state, when downlink data is to be transmitted to the UE, the RAN pages the UE to trigger the UE to enter the CONNECTED state. When the UE has uplink data to be transmitted, the UE enters the CONNECTED state first before transmitting the uplink data.

To enter the CONNECTED state from the INACTIVE state, the UE performs an RRC Resume process 150 in which the UE context is fetched from the UE's last serving cell and restored to the UE and the (new) serving cell. The RRC Resume process expedites the transition to the CONNECTED state as compared to transitioning from the IDLE state from the CONNECTED state by allowing resumption of the previous connection without having to perform extensive NAS signaling.

Figure 2:
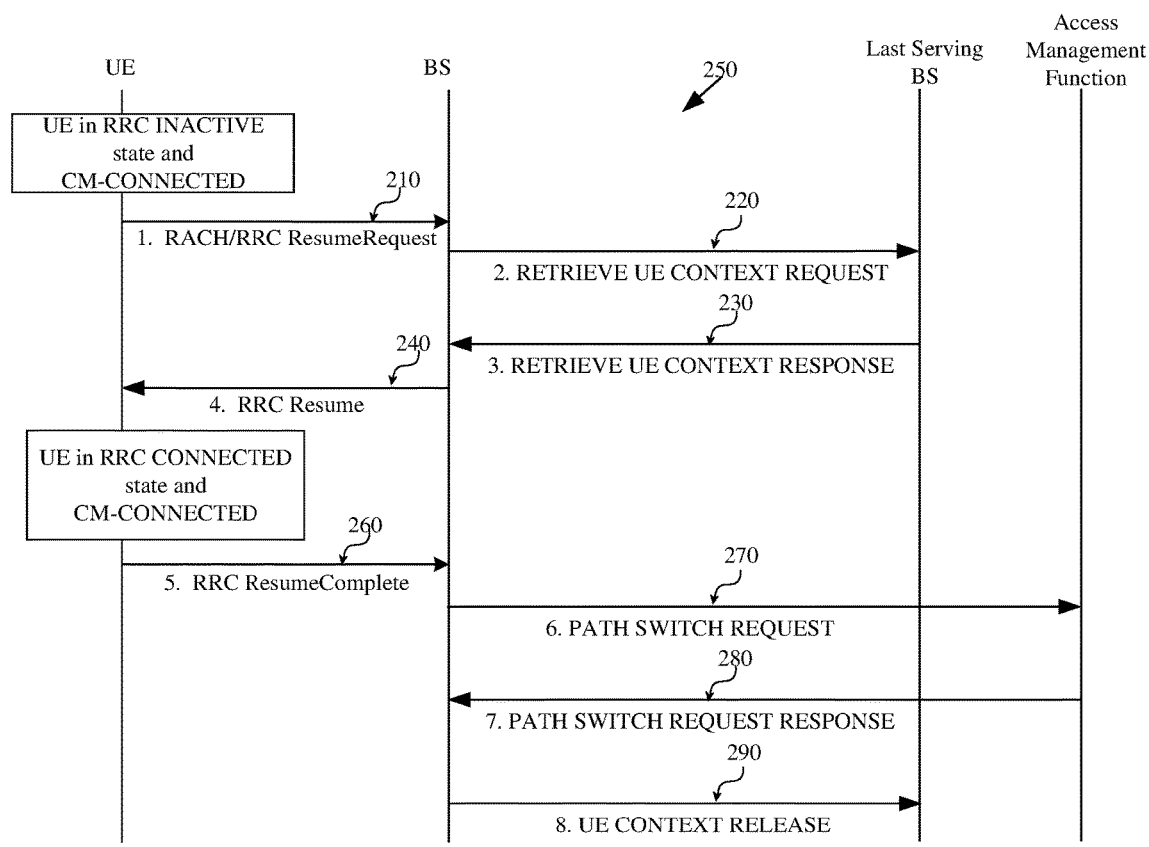
FIG. 2 illustrates an example RRC resume process, according to one aspect of the disclosure.

An example RRC resume process 250 is outlined in FIG. 2. The UE is initially in the INACTIVE state. At 210 the UE uses a RACH process to communicate an RRC ResumeRequest to the gNB on which it is camping. The RRC ResumeRequest includes an inactive radio network temporary identifier (I-RNTI) for the UE, which is allocated to the UE by the network when the UE enters the inactive state. The network uses the I-RNTI provided with the ResumeRequest to identify the UE and the last serving cell so that the new serving cell may fetch the UE context from the last serving cell.

The UE uses a RACH process to contact the network when the UE wishes to communicate with the network and does not have allocated UL resources. Thus, the UE uses the RACH process to transmit the ResumeRequest to the network. There are two types of RACH processes—contention based RACH (CBRA) and contention free RACH (CFRA). In CBRA, the UE randomly selects a preamble used to identify the UE in the initial message with the network. In CFRA, the preamble is assigned to the UE by the network when the UE enters a state in which the UE does not have allocated UL resources. CFRA will be discussed in more detail within the context of an INACTIVE UE performing direct transmission using CFRA.

Figure 3A:
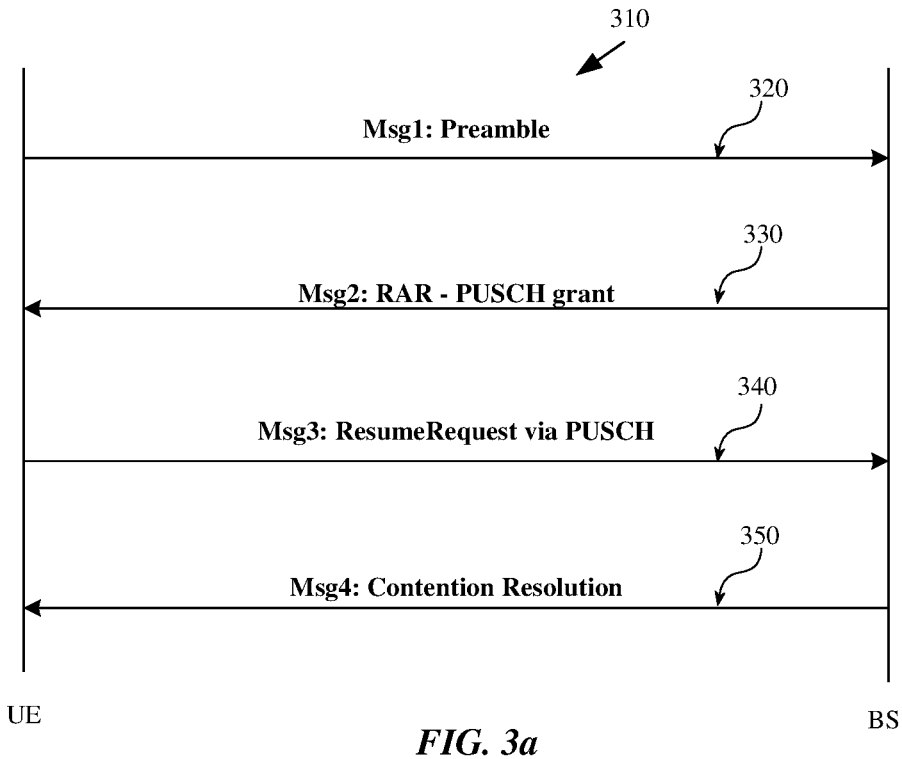
FIG. 3a illustrates a 4 step contention-based RACH (CBRA) process, according to one aspect of the disclosure.
Figure 3B:
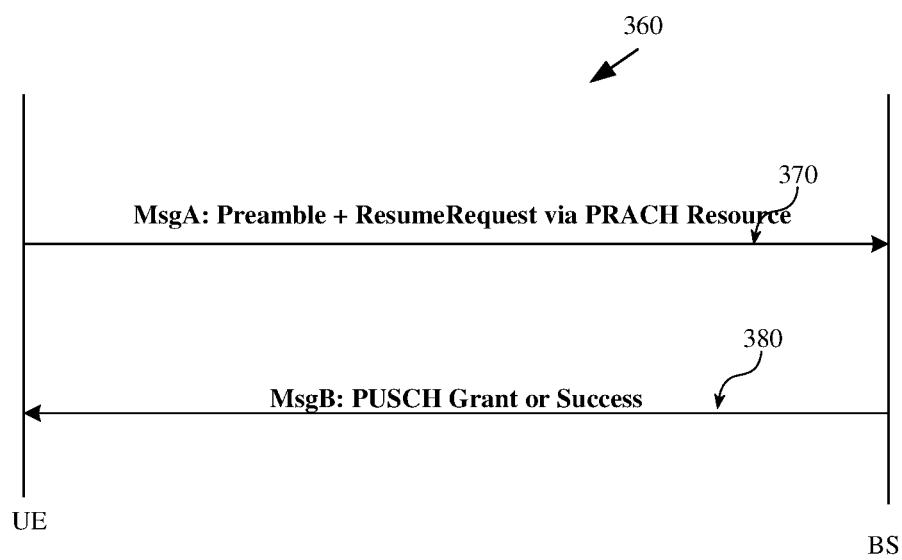
FIG. 3b illustrates a two step CBRA process 360, according to one aspect of the disclosure.

Two types of a contention-based RACH (CBRA) process 310 and 360 that may be used to communicate the RRC ResumeRequest are illustrated in more detail in FIGS. 3A and 3B. While the RACH process is described here in the context of communicating a ResumeRequest, the RACH process is used by the UE any time an UE desires to achieve uplink synchronization with the gNB to enter the CONNECT state from the IDLE or INACTIVE state or obtain resources for uplink transmission in the CONNECT state.

FIG. 3a illustrates a 4 step contention-based RACH (CBRA) process. At 320, using a predetermined PRACH occasion, the UE transmits Msg1 which includes a preamble that identifies the UE. In CBRA the preamble is randomly selected by the UE from a set of possible preambles. In another type of RACH process, contention-free RACH (CFRA), the preamble and optionally also PUSCH resources are configured to the UE when the UE enters the INACTIVE or IDLE state. Because it is possible that another UE selects the same preamble via the same PRACH resource, CBRA includes a contention resolution step 350 as will be described below. Along with the preamble, the UE also indicates a response window during which the UE expects a response from the gNB. If the UE does not receive a response within the window, the UE will re-transmit the preamble and/or take other remedial action.

At 330, the gNB transmits Msg2 containing a RACH response (RAR) that includes downlink control information (DCI) that is scrambled based on the preamble transmitted by the UE. The DCI includes information that allows the UE to decode a physical downlink shared channel (PDSCH) that communicates an identifier for the UE as well as an allocation of UL resources for use by the UE. At 340, the UE transmits Msg3 using the UL resources received in the RAR. In the instant example, Msg3 will include the ResumeRequest. In other examples, the Msg3 may include other data.

The UE sets a contention timer upon sending Msg3 and monitors the physical downlink control channel (PDCCH) for Msg4, which is sent by the gNB at 350. Msg4 includes a level 2 media access control physical data unit (L2 MAC PDU) that includes a Contention Resolution MAC control element (CE) used by the UE to determine whether the RACH process was successful or not. When the UE does not receive Msg4 before the timer expires it is assumed that the RACH process was not successful. At this point, the UE has successfully notified the gNB of its intention to enter the CONNECT state (e.g., step 210 of FIG. 2 is complete).

FIG. 3B illustrates a two step CBRA process 360. At 370, the UE transmits MsgA which includes the information sent in Msg1 and Msg3 of the 4 step RACH process of FIG. 3A. MsgA includes the randomly selected preamble transmitted on PRACH resources as well as the RRC ResumeRequest which is transmitted using PUSCH resources. At 380 the gNB transmits MsgB which can include a fallback RAR that includes an uplink grant for the UE to re-transmit MsgA when the gNB detects MsgA but cannot decode it. If the gNB successfully decodes MsgA, MsgB includes a success RAR that may include a new UL/DL grant for subsequent communication of data (not re-transmission of the RRC ResumeRequest). At this point, the UE has successfully notified the gNB of its intention to enter the CONNECT state (e.g., step 210 of FIG. 2 is complete).

Returning to the RRC Resume process outlined in FIG. 2, at 220 after the ResumeRequest has been received by the gNB, the gNB requests the UE context information that was stored by the last serving gNB as part of the RRC Suspend process. At 230, the last serving gNB provides the UE context information to the new serving gNB. At 240, the gNB communicates an RRC Resume message to the UE to indicate that the UE may enter the CONNECTED state. At 260, the UE indicates to the gNB that the UE has successfully entered the CONNECTED state. At 270, the gNB transmits a Path Switch request that updates the radio bearers for the UE to the Access and Mobility Management Function (AMF), which is the gNB's interface with the CN. At 280, the AMF responds to the gNB confirming the path switch is complete. At 290 the gNB informs the last serving gNB that it can delete the UE context. After these communications have occurred, the UE may transmit data to and receive data from the gNB.

Figure 4A:
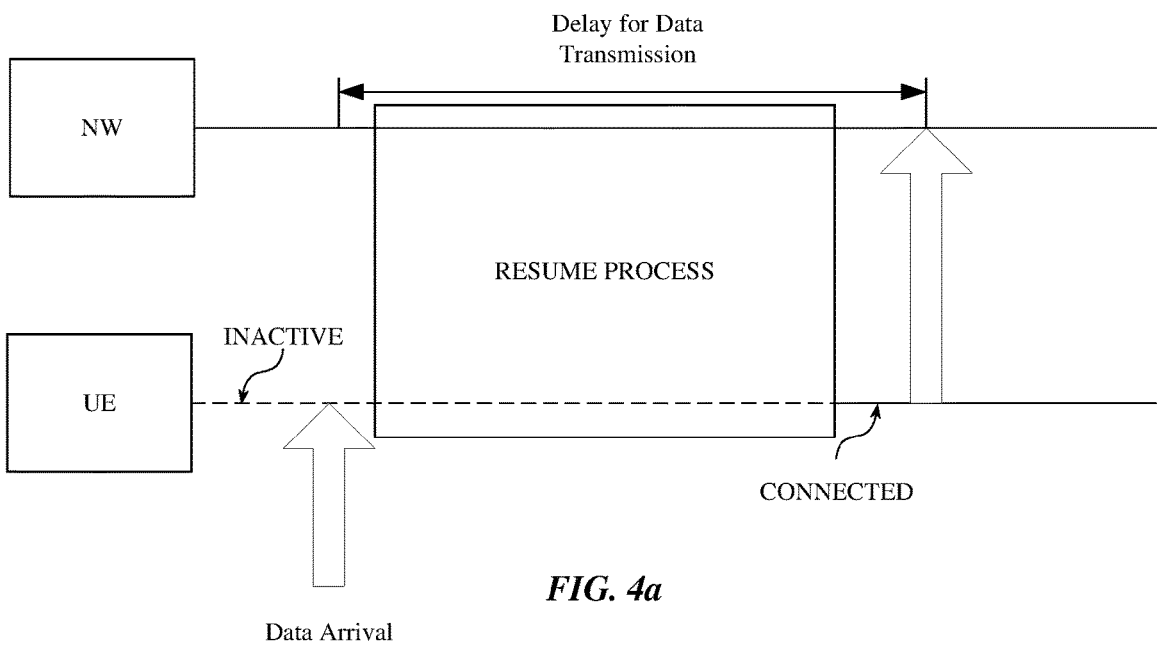
FIG. 4a illustrates a data transmission process from a UE in an INACTIVE state, according to one aspect of the disclosure.
Figure 4B:
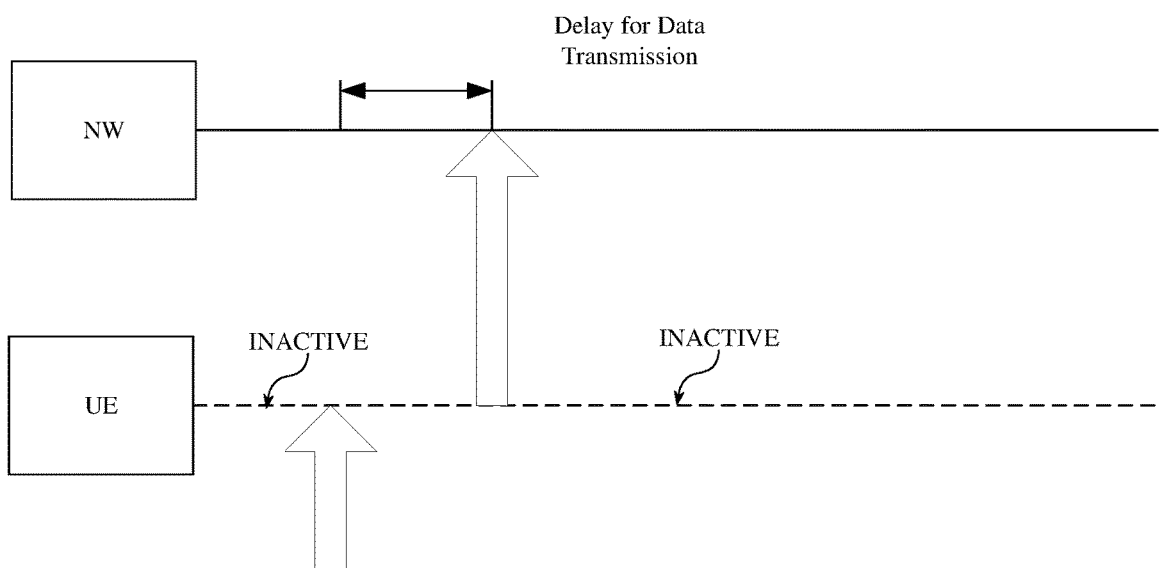
FIG. 4b illustrates a data transmission process from a UE in an INACTIVE state, according to another aspect of the disclosure.

Referring to FIG. 4a, it can be seen that the resume process introduces significant delay between when the UE has data to transmit and the UE is able to transmit the data. Therefore, in some aspects, the UE is configured to perform direct transmission of data (e.g., small data transmissions) to the base station while in the INACTIVE state without transitioning to the CONNECTED state, as illustrated in FIG. 4B. In some aspects, the direct data transmission in the INACTIVE state is enabled using RACH procedure. Specifically, uplink (UL) data from the INACTIVE UE is transmitted using Msg3 (e.g., the Msg3 340 in FIG. 3a) or MsgA (e.g., the MsgA 370 in FIG. 3b). Alternately, in other aspects, the direct data transmission in the INACTIVE state is based on preconfigured PUSCH resources (e.g., by reusing the configured grant type-1).

Figure 5:
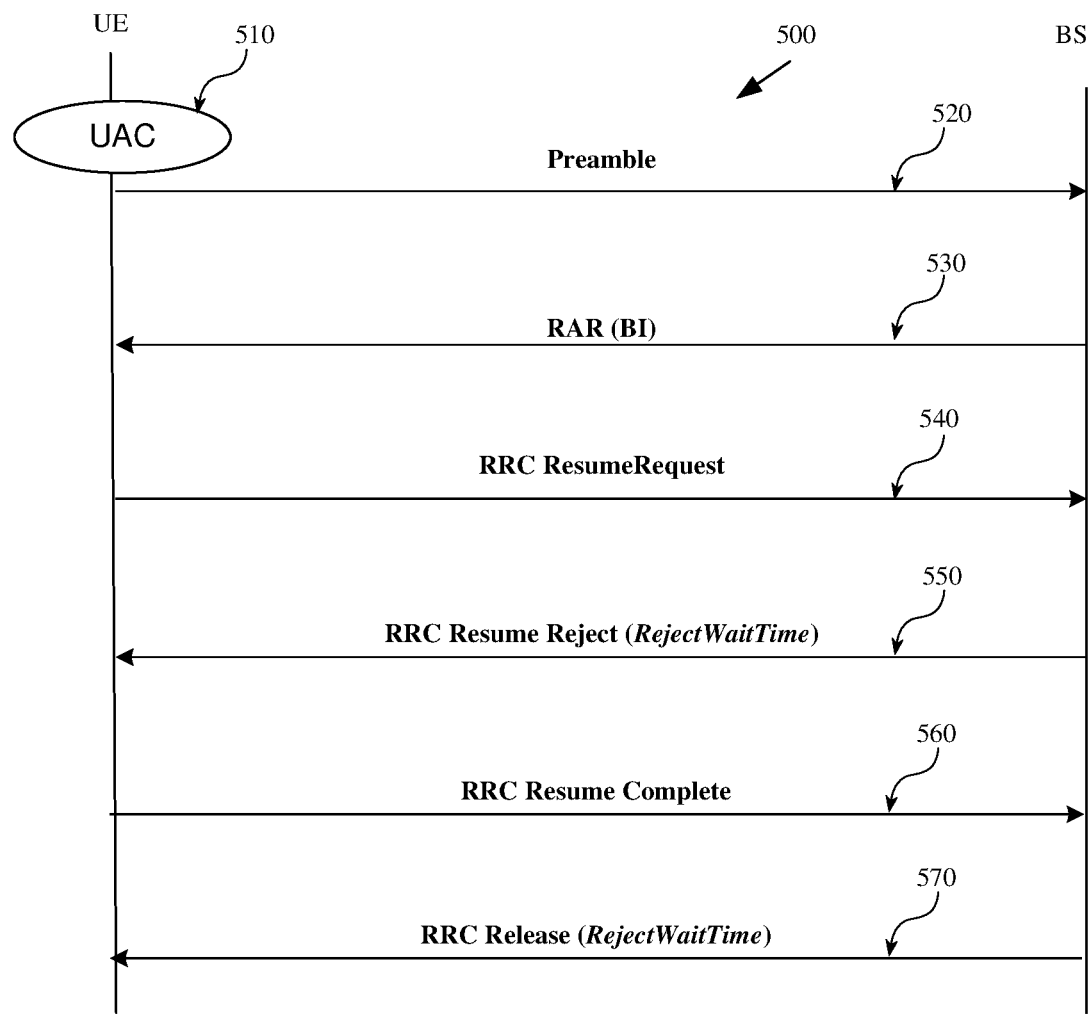
FIG. 5 illustrates an RRC resume process that facilitates the transition of a UE from INACTIVE state to the CONNECTED state, according to one aspect of the disclosure.

Various access control schemes are utilized during a resume process when a UE in an INACTIVE state tries to transition to the CONNECTED state as illustrated in FIG. 5. Specifically, FIG. 5 illustrates an RRC resume process 500 that facilitates the transition of a UE from INACTIVE state to the CONNECTED state (with various access control schemes included). The resume process 500 is similar to the resume process 250 outlined in FIG. 2. In a first option, when the UE in the INACTIVE state has data to transmit, the UE is configured to perform a unified access control (UAC) scheme 510 to control access attempts to the base station. In the UAC, each access attempt from the UE is categorized into one or more of the Access Identities and one of the Access Categories. Based on the access control information applicable for the corresponding Access Identity and Access Category of the access attempt, the UE performs a test whether the actual access attempt can be made or not. The wireless communication network shall broadcast barring control information (i.e. a list of barring parameters associated with an Access Identity and an Access Category) in one or more areas of the RAN. The UE shall be able to determine whether or not a particular new access attempt is allowed based on barring parameters that the UE receives from the broadcast barring control information and the configuration in the UE.

Additionally, or alternatively, when there is RACH overload, a RACH backoff mechanism is utilized for access control, where a backoff indicator (BI) is provided as part of the RAR 530. In some aspects, BI comprises a parameter indicating the time delay between a PRACH and the next PRACH. The BI is included in a BI media access control (MAC) control element (CE). Therefore, during RACH overload/failure, the UE can resend the preamble 520 based on the BI. Additionally or alternatively, when there is RAN overload, the base station is configured to provide an RRC Reject message 550 (instead of RRC Resume 240 in FIG. 2) that indicates that the current access attempt is rejected. The RRC Reject message 550 further includes a RejectWaitTime that indicates a wait time for the next access attempt (i.e., when the preamble 520 can be send next). Additionally or alternately, when there is core network (CN) overload, the base station is configured to send an RRC Release message 570 to release the RRC connection, thereby transitioning the UE from the CONNECTED state back to the INACTIVE state. The RRC release message 570 further includes a RejectWaitTime that indicates a wait time for the next access attempt (i.e., when the preamble 520 can be send next). Further, in some aspects, the UE sets different ResumeCause values in the RRC Resume Request 540 and the base station can rely on the ResumeCause values to perform access control. Specifically, the base station can rely on the ResumeCause values to decide whether to accept or reject the UE's access attempt. Some of the example ResumeCause values include emergency, highPriorityAccess, mt-Access, mo-Signalling, mo-Data, mo-VoiceCall, mo-VideoCall, mo SMS, rna-Update, mps-PriorityAccess.

The above access control procedures are applicable only in aspects where the UE moves from the INACTIVE state to the CONNECTED state, for data transmission (e.g., as illustrated in FIG. 4a). However, in aspects where the UE performs direct transmission in the INACTIVE state (as illustrated in FIG. 4b), the resume process is not involved and therefore, the above-mentioned access control procedures are not applicable. Therefore, it is essential to define access control procedures when the UE performs direct transmission in the INACTIVE state. Disclosed herein are systems, circuitries, and techniques for allowing access control when a UE performs direct transmission of data to a base station while in the INACTIVE state without transitioning to the CONNECTED state, as illustrated in FIG. 4B.

Figure 6:
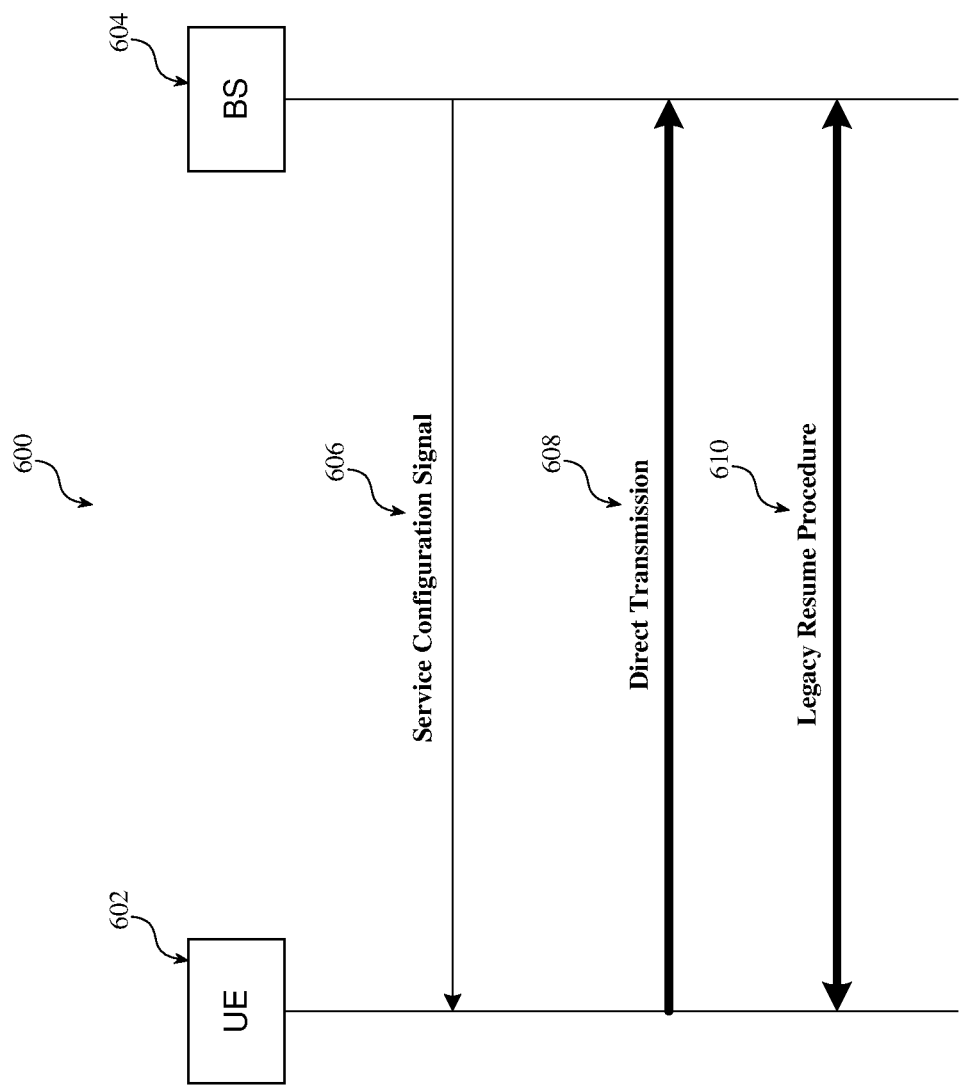
FIG. 6 illustrates a simplified block diagram of a wireless communication system that facilitates access control, according to one aspect of the disclosure.

FIG. 6 illustrates a simplified block diagram of a wireless communication system 600 that facilitates access control, according to one aspect of the disclosure. The wireless communication system 600 comprises user equipment (UE) 602 and a base station 604. In other aspects, however, the wireless communication system 600 can comprise a plurality of UEs and is not shown here for clarity purposes. In some aspects, the base station 604 is equivalent to an eNodeB in LTE systems, gNodeB in 5G new radio (NR) systems or a network device associated with any other generations of cellular technologies. In some aspects, the UE 602 may comprise a mobile phone, tablet computer, an internet of things (IoT) device, a vehicle-to-everything (V2X) UE, etc. The UE 602 and the base station 604 are configured to communicate with one another over a communication medium (e.g., air). In some aspects, the UE 602 is configured to perform direct data transmission with the base station 604 during an INACTIVE state of the UE 602 as explained above. In some aspects, the direct data transmission from the UE 602 in the INACTIVE state is enabled using RACH procedure. Specifically, uplink (UL) data from the UE 602 in the INACTIVE state is transmitted using Msg3 or MsgA associated with a RACH procedure, as explained above. Alternately, in other aspects, the direct data transmission from the UE 602 in the INACTIVE state is based on preconfigured PUSCH resources (e.g., reusing the configured grant type-1).

In order to facilitate access control during the direct data transmission in the INACTIVE state of the UE 602, in some aspects, the base station 604 is configured to configure one or more service configurations associated with a data transmission that are allowed to be transmitted by the UE 602 during the INACTIVE state of the UE 602. In other words, the base station 604 configures one or more types of services (i.e., one or more service configurations) associated with a data transmission that are allowed to be transmitted by the UE 602 in the INACTIVE state to the base station 604.

Specifically, the base station 604 is configured to generate a service configuration signal 606 comprising one or more service configurations associated with a data transmission that are allowed to be transmitted by the UE 602 to the base station 604, during an INACTIVE state of the UE 602. In some aspects, the one or more service configurations within the service configuration signal 606 include one or more of an indication of a dedicated radio bearer (DRB) that is allowed to be transmitted in INACTIVE state, an indication whether radio resource control (RRC)/non-access stratum (NAS) is allowed to be transmitted in INACTIVE state, an indication whether paging triggered direct transmission is allowed in the INACTIVE state, an indication on which access category and access identity are allowed to be transmitted in the INACTIVE state, and an indication on the Resume Cause(s) that are allowed to be transmitted in the INACTIVE state. However, other types of service configurations may be included as part of the service configuration signal 606, in other aspects.

After generating the service configuration signal 606, the base station 604 is further configured to provide the service configuration signal 606 to the UE 602. In some aspects, the base station 604 is configured to provide the service configuration signal 606 to the UE 602 via dedicated signaling. Alternately, in other aspects, the base station 604 is configured to provide the service configuration signal 606 to the UE 602 via broadcast signaling in the camping cell. Upon receiving the service configuration signal 606, the UE 602 is configured to process the service configuration signal 606 and determine the one or more service configurations included within the service configuration signal 606.

When the UE 602 receives an uplink (UL) data to be provided to the base station 604 during the INACTIVE state of the UE 602, the UE 602 is configured to process the UL data and determine one or more service configurations associated with a direct transmission of the UL data to the base station 602. For example, the UE 602 may determine the DRB to be utilized for the direct transmission, ResumeCause associated with the direct transmission etc. Upon determining the one or more service configurations associated with the direct transmission of the UL data, the UE 602 is configured to selectively perform the direct transmission 608 comprising the UL data to the base station 604 during the INACTIVE state of the UE 602, based on the determination. Specifically, the UE 602 is configured to perform the direct transmission 608 comprising the UL data to the base station 604 during the INACTIVE state of the UE 602, when the one or more service configurations associated with the direct transmission 608 of the UL data comprise service configurations that are configured as part of the service configuration signal 606 received from the base station 604. In other words, if one or more service configurations associated with the direct transmission 608 of the UL data, for example, ResumeCause, access identity etc. corresponds to/matches with the ResumeCause, access identity etc. that was indicated as part of the service configuration signal 606, then the UE 602 performs the direct transmission 608 to the base station 604 during the INACTIVE state. Subsequently, the base station 604 is configured to receive and process the direct transmission 608 comprising the UL data.

Alternately, when the one or more service configurations associated with the direct transmission of the UL data is not configured within the service configuration signal 606 received from the base station, the UE 602 is not configured to perform the direct transmission 608 comprising the UL data to the base station 604 during the INACTIVE state of the UE 602. Rather, in such aspects, UE 602 is configured to transition from the INACTIVE state to the CONNECTED state, in order to perform a transmission of the UL data to the base station 604. In some aspects, the UE 602 is configured to utilize a legacy resume procedure 610 (e.g., the RRC resume process 250 in FIG. 2 above), in order to transition from the INACTIVE state to the CONNECTED state. For example, the UE 602 is configured to provide a radio resource control (RRC) resume request signal (e.g., the RRC resume request in FIG. 2) to the base station 604, in order to transition the UE 602 from the INACTIVE state to the CONNECTED state.

FIG. 7a illustrates a simplified block diagram of a wireless communication system 700 that facilitates access control, according to one aspect of the disclosure. The wireless communication system 700 comprises user equipment (UE) 702 and a base station 704. In other aspects, however, the wireless communication system 700 can comprise a plurality of UEs and is not shown here for clarity purposes. In some aspects, the base station 704 is equivalent to a base station, e.g., an eNodeB in LTE systems, a gNodeB in 5G new radio (NR) systems or a network device associated with any other generations of cellular technologies. In some aspects, the UE 702 may comprise a mobile phone, tablet computer, an internet of things (IoT) device, a vehicle-to-everything (V2X) UE, etc. The UE 702 and the base station 704 are configured to communicate with one another over a communication medium (e.g., air). In some aspects, the UE 702 is configured to perform direct data transmission with the base station 704 during an INACTIVE state of the UE 702 as explained above. In some aspects, the direct data transmission from the UE 702 in the INACTIVE state is enabled using RACH procedure. Specifically, uplink (UL) data from the UE 702 in the INACTIVE state is transmitted using Msg3 or MsgA associated with a RACH procedure. Alternately, in other aspects, the direct data transmission from the UE 702 in the INACTIVE state is based on preconfigured PUSCH resources (e.g., reusing the configured grant type-1).

When the UE 702 receives an uplink (UL) data to be provided to the base station 704 during the INACTIVE state of the UE 702, the UE 702 is configured to process the UL data and generate a direct transmission signal comprising the UL data to be provided to the base station 704. In some aspects, the direct transmission signal comprising the UL data comprises one or more direct transmissions, each direct transmission comprising one transport block (TB) associated with the direct transmission signal. In some aspects, a transport block corresponds to a media access control (MAC) protocol data unit (PDU). In some aspects, each of the one or more direct transmissions are to be provided to the base station 704 in a sequence at different time instances. For example, a first transmission of the one or more direct transmissions is transmitted first, followed by a next direct transmission, and so on. In some aspects, the first transmission comprises a first TB or a first MAC PDU associated with the direct transmission signal. In some aspects, the direct transmission signal is generated based on processing a service configuration signal (e.g., the service configuration signal 606) that comprises an indication of one or more service configurations associated with a data transmission that are allowed to be transmitted by the UE during an INACTIVE state of the UE, as explained above with respect to FIG. 6. However, in other aspects, the direct transmission signal is not generated based on processing the service configuration signal.

In order to facilitate access control during the transmission of the direct transmission signal in the INACTIVE state of the UE 702, in some aspects, the UE 702 is configured to include access control information comprising one or more access control parameters associated with the direct transmission signal within the first transmission associated with the direct transmission signal. In other words, the UE 702 is configured to include the access control information as part of a first MAC PDU associated with the direct transmission signal. In some aspects, the access control information is included with an access control (AC) MAC control element (CE) within the first MAC PDU. In some aspects, the access control information comprises at least one of a Resume Cause and a priority. In some aspects, a mapping between the priority and dedicated radio bearer (DRB)/logical channel group (LCH) is preconfigured by the base station 704. In some aspects, the first MAC PDU my comprise both the access control information and the UL data. Alternately, in other aspects, the first MAC PE may not include the UL data. In such aspects, the UL data is included as part of the subsequent direct transmissions associated with the direct transmission signal.

Upon generating the direct transmission signal, the UE 702 is configured to provide the first transmission 706 (comprising the access control information in the AC MAC CE) associated with the direct transmission signal to the base station 704. The base station 704 is configured to receive and process the first transmission 706 from the UE 702. Upon processing the first transmission 706, the base station 704 is configured to control subsequent direct transmissions from the UE 702 in the INACTIVE state, based on the access control information within the first transmission 706 or network conditions, or both. In other words, in case of network congestion, the base station 704 is configured to allow/reject subsequent direct transmissions from the UE 702 in the INACTIVE state, based on the access control information included in the first transmission 706. For example, during network congestion, the base station 704 may reject subsequent direct transmissions from the UE 702 in the INACTIVE state, when the access information indicates a low priority data. In such aspects, the UE 702 may be configured to monitor one or more signals from the base station 704, upon providing the first transmission 706, to determine whether the base station 704 rejects UE access at this time.

The base station 704 may be configured to reject subsequent direct transmissions from the UE 702 in the INACTIVE state differently in different aspects. For example, in a first aspect, the base station 704 is configured not to provide an access control (AC) feedback signal 722 to the UE 702 during a predefined AC feedback time window 726, in response to processing the first transmission 706, in order to reject subsequent data transmissions from the UE 702 in the INACTIVE state, as illustrated in FIG. 7b. When the UE 702 does not receive the AC feedback signal 722 within the predefined AC feedback window after the first transmission 706, the UE 702 is configured to initiate a legacy resume procedure 724 (e.g., the RRC resume process 250 in FIG. 2), in order to transition to the CONNECTED state. In such aspects, the UE 702 is configured to perform further data transmissions to the base station 704 in the CONNECTED state.

In a second aspect, the base station 704 is configured to selectively provide a delay indication signal 742 comprising a delay timer value T to the UE 702, based on the access control information within the first transmission 706 or network conditions, or both, in order to reject subsequent data transmissions from the UE 702 in the INACTIVE state, as illustrated in FIG. 7c. In some aspects, the delay indication signal 742 indicates to the UE 702 to delay a subsequent direct transmission in the INACTIVE state of the UE 702 to the base station 704 by the delay timer value T. When the UE 702 receives the delay indication signal 742, the UE 702 is configured to start a delay timer 746 with the delay time value T, based on processing the delay indication signal 742, and stop any subsequent direct transmission (e.g., the direct transmission 744) to the base station 704 in the INACTIVE state of the UE 702, until the delay timer expires.

Figure 7E:
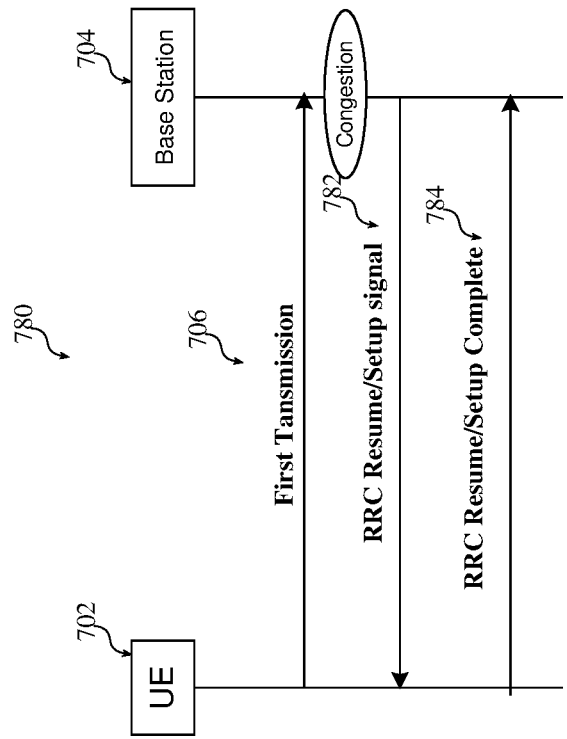
Figure 7D:
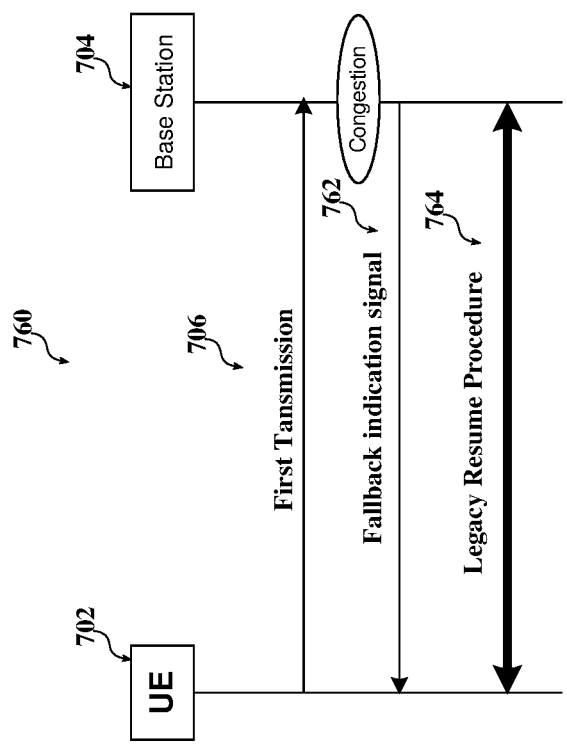

In a third aspect, the base station 704 is configured to selectively provide a fallback indication signal 762 to the UE 702, based on the access control information within the first transmission 706 or network conditions, or both, in order to reject subsequent data transmissions from the UE 702 in the INACTIVE state, as illustrated in FIG. 7d. In some aspects, the fallback indication signal 762 indicates to the UE 702 to fallback to a legacy resume procedure 764 (e.g., the RRC resume process 250 in FIG. 2), in order to transition the UE 702 from the INACTIVE state to a CONNECTED state. When the UE 702 receives the fallback indication signal 762, the UE 702 is configured to process the fallback indication signal 762 and initiate the legacy resume procedure 764, in order to transition to the CONNECTED state. In such aspects, the UE 702 is configured to perform further data transmissions to the base station 704 in the CONNECTED state.

In a fourth aspect, the base station 704 is configured to selectively provide a radio resource control (RRC) resume/setup signal 782 to the UE 702, based on the access control information within the first transmission 706 or network conditions, or both, in order to reject subsequent data transmissions from the UE 702 in the INACTIVE state, as illustrated in FIG. 7e. In some aspects, the RRC resume/setup signal 782 indicates the UE 702 to transition from the INACTIVE state to the CONNECTED state. When the UE 702 receives the RRC resume/setup signal 782, the UE 702 is configured to process the RRC resume/setup signal 782 and transition to the CONNECTED state. Upon transitioning to the CONNECTED state, the UE 702 is further configured to provide an RRC resume/setup complete signal 784 to the base station 704. In some aspects, the RRC resume/setup complete signal 784 indicates to the base station 704 that the UE 702 is transitioned to the CONNECTED state. In such aspects, the UE 702 is configured to perform further data transmissions to the base station 704 in the CONNECTED state.

FIG. 8a illustrates a simplified block diagram of a wireless communication system 800 that facilitates access control, according to one aspect of the disclosure. Specifically, the wireless communication system 800 facilitates access control by providing a backoff mechanism during a first transmission associated with a direct transmission signal in the INACTIVE state of a UE. The wireless communication system 800 comprises user equipment (UE) 802 and a base station 804. In other aspects, however, the wireless communication system 800 can comprise a plurality of UEs and is not shown here for clarity purposes. In some aspects, the base station 804 is equivalent to an eNodeB in LTE systems, gNodeB in 5G new radio (NR) systems or a network device associated with any other generations of cellular technologies. In some aspects, the UE 802 may comprise a mobile phone, tablet computer, an internet of things (IoT) device, a vehicle-to-everything (V2X) UE, etc. The UE 802 and the base station 804 are configured to communicate with one another over a communication medium (e.g., air). In some aspects, the UE 802 is configured to perform direct data transmission with the base station 804 during an INACTIVE state of the UE 802 as explained above. In some aspects, the direct data transmission from the UE 802 in the INACTIVE state is enabled using RACH procedure. Specifically, uplink (UL) data from the UE 802 in the INACTIVE state is transmitted using Msg3 or MsgA associated with a RACH procedure, as explained above. Alternately, in other aspects, the direct data transmission from the UE 802 in the INACTIVE state is based on preconfigured PUSCH resources (e.g., reusing the configured grant type-1).

When the UE 802 receives an uplink (UL) data to be provided to the base station 804 during the INACTIVE state of the UE 802, the UE 802 is configured to process the UL data and generate a direct transmission signal comprising the UL data to be provided to the base station 804 during the INACTIVE state of the UE 802. In some aspects, the direct transmission signal comprising the UL data comprises one or more direct transmissions, each direct transmission comprising one transport block (TB) associated with the direct transmission signal. In some aspects, a transport block corresponds to a media access control (MAC) protocol data unit (PDU). In some aspects, each of the one or more direct transmissions are to be provided to the base station 804 in a sequence at different time instances. For example, a first transmission of the one or more direct transmissions is transmitted first, followed by a next direct transmission, and so on. In some aspects, the first transmission comprises a first TB or a first MAC PDU associated with the direct transmission signal. In some aspects, the direct transmission signal is generated based on processing a service configuration signal (e.g., the service configuration signal 606) that comprises an indication of one or more service configurations associated with a data transmission that are allowed to be transmitted by the UE during an INACTIVE state of the UE, as explained above with respect to FIG. 6. However, in other aspects, the direct transmission signal not is generated based on processing the service configuration signal. Further, in some aspects, the first transmission may comprise access control information comprising one or more access control parameters associated with the direct transmission signal, included as part of the first MAC PDU (e.g., within the AC MAC CE), as explained above with respect to FIG. 7a.

Upon generating the direct transmission signal, the UE 802 is configured to provide a first transmission 806 (i.e., a first TB or a first MAC PDU) associated with the direct transmission signal to the base station 804. Upon providing the first transmission 806 to the base station 804, the UE 802 is configured to monitor one or more indicator signals 808 from the base station 804, in order to determine whether the first transmission 806 is successful or not. A successful transmission comprises a transmission that is received and processed (decoded) at the base station. In one aspect, when the first transmission 806 is transmitted via a random access channel (RACH) procedure, in some aspects, the UE 802 is configured to monitor a random access response (RAR) message (which comprises the indicator signal 808) associated with the RACH procedure, in order to determine if the first transmission 806 is successful or not. In some aspects, a value B of a backoff indicator (BI) that is provided as part of the RAR is indicative of whether the first transmission 806 is successful or not. For example, when the value of B is set to 0, the UE identifies the first transmission 806 as successful. Otherwise, the UE identifies the first transmission 806 as not successful. In such aspects, the base station 804 is configured to provide the RAR message (i.e., the indicator signal 808) comprising the BI to the UE 802. Alternately, in other aspects, the base station 804 may be configured to provide other explicit signaling (or other indicator signal 808) to the UE 802, in order to indicate that the first transmission 806 (via RACH) is not successful.

In another aspect, when the first transmission 806 is transmitted using a preconfigured grant, the UE 802 is configured to monitor an ACK feedback signal (comprising the indicator signal 808) from the base station 804, during a predefined feedback window after the first transmission 806. In some aspects, the first transmission 806 is determined to be not successful, when the ACK feedback signal is not received from the base station 804 during the predefined feedback window after the first transmission 806. Alternately, in other aspects, the base station 804 may be configured to provide other explicit signaling to the UE 802, in order to indicate that the first transmission 806 (via preconfigured grant) is not successful.

Upon determining that the first transmission 806 is not successful, in order to facilitate access control, the UE 802 is configured to start a backoff timer 812 with a backoff time value associated therewith. The UE 802 is further configured to delay any retransmission (e.g., the retransmission 810) of the first transmission 806 in the INACTIVE state of the UE 802, until the backoff timer 812 expires. In some embodiments, the backoff timer expires when a time equivalent to the backoff time value is passed. Once the backoff timer 812 expires, in some aspects, the UE 802 is configured to perform a retransmission 810 of the first transmission 806 in the INACTIVE state of the UE 802, if the UL data associated with the direct transmission signal is still available. In some aspects, the UE 802 is configured to perform one or more retransmissions 810 of the first transmission 806 in the INACTIVE state of the UE 802, until the UE 802 receives an indication that a previous retransmission is successful or until a maximum retransmission number is reached. In some aspects, the UE 802 is configured to identify the first transmission 806 as a failure, when the maximum retransmission number is reached and the corresponding retransmission is not successful.

The UE 802 may be configured to determine the backoff timer value associated with the backoff timer 812 differently in different aspects. For example, when the first transmission 806 is transmitted via the RACH, the UE 802 is configured to determine the backoff time value based on the acquired backoff indicator (BI) within the RAR (as explained above) associated with the RACH and a preconfigured special backoff parameter. In some aspects, the special backoff parameter is configured per dedicated radio bearer (DRB), per ResumeCause, per priority and per access identity associated with a data transmission. Therefore, in such aspects, the UE 802 is configured to apply the special backoff parameter on the acquired BI, in order to determine the backoff time value.

Further, when the first transmission 806 is transmitted using the preconfigured grant, the UE 802 is configured to determine the backoff timer value based on a backoff value that is acquired from a common channel, for example, a common control channel (CCCH) during the predefined feedback window when the UE 802 monitors the ACK feedback signal (as explained above). In some aspects, the CCCH comprises a logical channel that is predefined. In some aspects, the base station 804 is configured to provide the backoff timer value over the CCCH to the UE 802. In some aspects, the UE 802 is configured to apply the acquired backoff value directly as the backoff timer value. Alternately, in other aspects, the UE 802 is configured to apply a random value between 0 and the acquired backoff value as the backoff timer value. Further, in some aspects, the UE 802 is configured to determine the backoff timer value based on the acquired backoff value (from the CCCH) and a special backoff factor that is configured for each access category, ResumeCause, access identity, priority and dedicated radio bearer (DRB). In some aspects, the base station 804 is configured to configure the special backoff factor. Furthermore, in some aspects, the UE 802 is configured to determine the backoff timer value based on a predefined backoff value that is configured for each access category, ResumeCause, access identity, priority or dedicated radio bearer (DRB). In some aspects, the base station 804 is configured to configure the backoff value.

When the UE 802 determines that the first transmission 806 is a failure (as explained above), in one aspect, the UE 802 is configured to perform or fallback to a legacy resume procedure 822 (e.g., the RRC resume process 250 in FIG. 2) to transition the UE 802 from the INACTIVE state to a CONNECTED state, as illustrated in FIG. 8*b*, in order to facilitate access control. In such aspects, the UE 802 is configured to perform subsequent data transmissions between the UE 802 and the base station 804, in the CONNECTED state. In another aspect, when the first transmission 806 is identified as a failure, the UE 802 is configured to start a second backoff timer 846 with a predefined second backoff timer value and perform a next retransmission 842 of the first transmission 806 upon the expiry of the second backoff timer, as illustrated in FIG. 8*c*, in order to facilitate access control. In some aspects, the predefined second backoff timer value may be configured by the base station 804. In some aspects, the UE 802 is configured to perform one or more retransmissions 842 of the first transmission 806 in the INACTIVE state of the UE 802, until the UE 802 receives an indication that a previous retransmission is successful or until a maximum retransmission number is reached. In some aspects, the UE 802 is configured to trigger a legacy resume procedure 844 (e.g., the RRC resume process 250 in FIG. 2) to transition to a CONNECTED state, when the maximum retransmission number is reached and the corresponding retransmission is not successful. Alternately, in another aspect, the UE 802 is configured to move to an IDLE state (not shown in the figure), when the maximum retransmission number is reached and the corresponding retransmission is not successful.

Figure 8D:
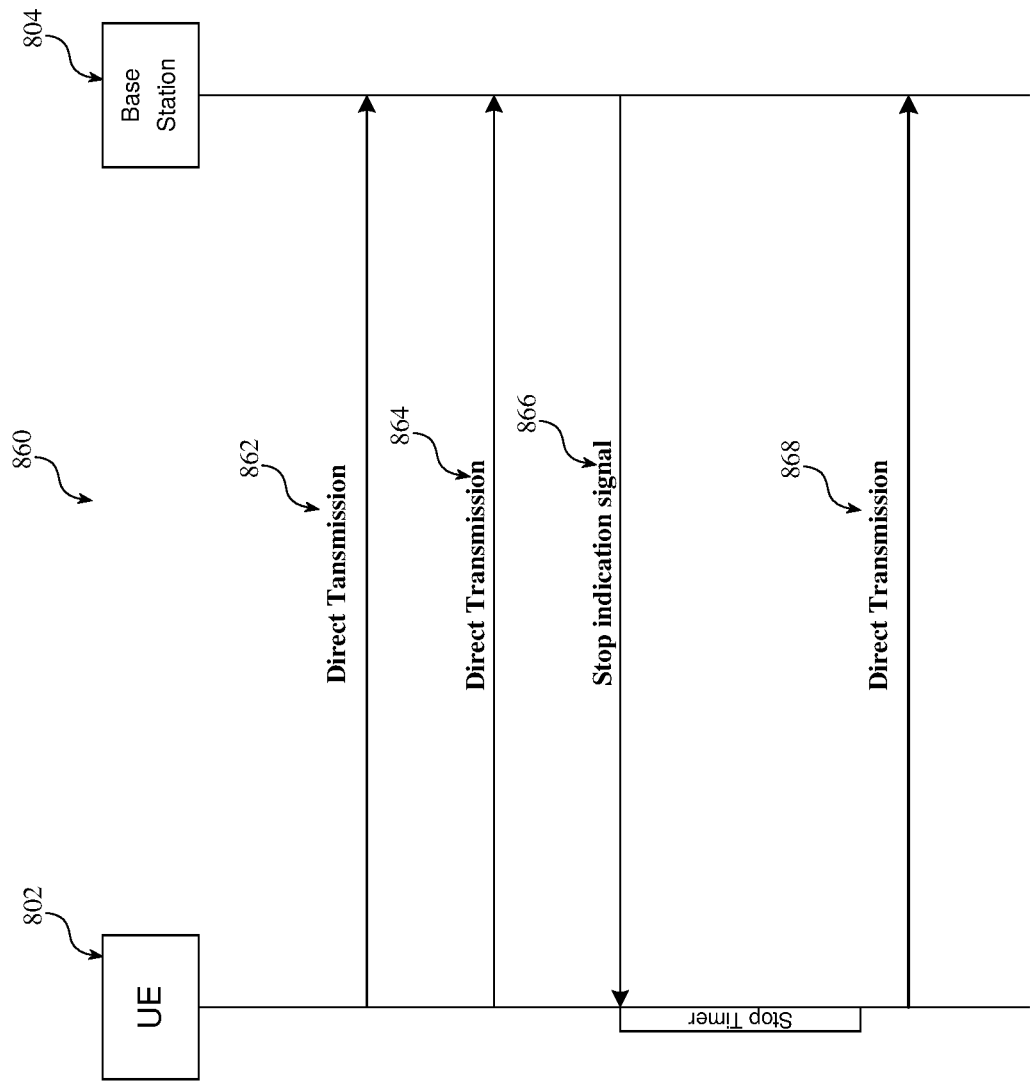

FIG. 8*d* illustrates another aspect that facilitates access control, where upon receiving one or more successful direct transmissions from the UE 802 in the INACTIVE state, at the base station 804, the base station 804 may be configured to determine whether to allow a subsequent direct transmission from the UE 802 in the INACTIVE state, based on network conditions. For example, as shown in FIG. 8*d*, the UE 802 is configured to provide one or more direct transmissions 862 and 864 to the base station 804 during the INACTIVE state of the UE 802. In some aspects, the one or more direct transmissions 862 and 864 may include a first transmission (i.e., a first MAC PDU) associated with a direct transmission signal. Upon receiving the one or more direct transmissions 862 and 862, the base station 804 is configured to process the one or more direct transmissions 862 and 864, and determine whether to allow a subsequent direct transmission from the UE in the INACTIVE state, based on network conditions. It is assumed that the direct transmissions 862 and 864 comprise successful transmissions. In some aspects, the base station 804 is configured to provide a stop indication signal 866 to the UE 802, when it is determined not to allow the subsequent direct transmissions from the UE 802 in the INACTIVE state.

In some aspects, the stop indication signal 866 indicates to the UE 802 to start a stop timer having an associated stop time value during which any direct transmission from the UE 802 in the INACTIVE state to the base station 804 is to be stopped. In some aspects, the stop timer value may be included as part of the stop indication signal 866. Alternately, in other aspects, the stop timer value may be pre-configured by radio resource control (RRC) signaling. Upon receiving the stop indication signal 866, the UE 802 is configured to process the stop indication signal 866 and start a stop timer based on the stop time value. Further, the UE 802 is configured to stop any direct transmission from the UE 802 in the INACTIVE state until the stop timer expires. Upon the expiry of the stop timer, the UE 802 may be configured to provide further direct transmissions (e.g., the direct transmission 868) to the base station 804 in the INACTIVE state of the UE 802, based on data availability at the UE 802.

Figure 9:
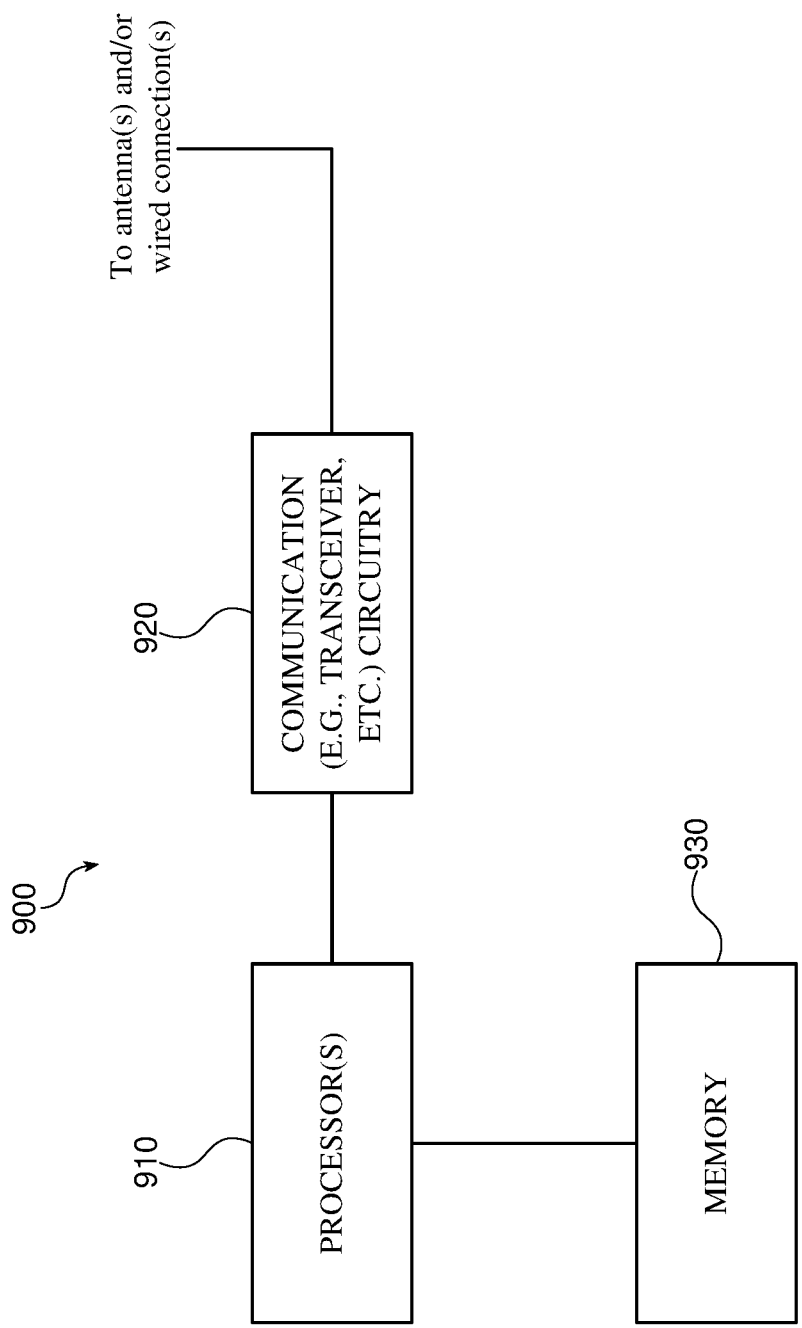
FIG. 9 illustrates a block diagram of an apparatus employable at a Base Station (BS), eNodeB, gNodeB or other network device, according to various aspects described herein.

Referring to FIG. 9, illustrated is a block diagram of an apparatus 900 employable at a Base Station (BS), eNodeB, gNodeB or other network device, according to various aspects described herein. In some aspects, the apparatus 900 may be included within the base station 604, the base station 704 and the base station 804 in the above aspects. However, in other aspects, the apparatus 900 could be included within any base station associated with a wireless communication system. The apparatus 900 can include one or more processors 910 (e.g., one or more baseband processors such as one or more of the baseband processors discussed in connection with FIG. 15 and/or FIG. 16) comprising processing circuitry and associated interface(s) (e.g., one or more interface(s) discussed in connection with FIG. 16), transceiver circuitry 920 (e.g., which can comprise circuitry for one or more wired connections and/or part or all of RF circuitry 1506, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 930 (which can comprise any of a variety of storage mediums and can store instructions and/or data associated with one or more of processor(s) 910 or transceiver circuitry 920).

In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 900 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 910, transceiver circuitry 920, and the memory 930 can be included in a single device, while in other aspects, they can be included in different devices, such as part of a distributed architecture. In some aspects, the processor(s) 910, transceiver circuitry 920, and the memory 930 can be included in an integrated circuit (IC) or chip.

Figure 10:
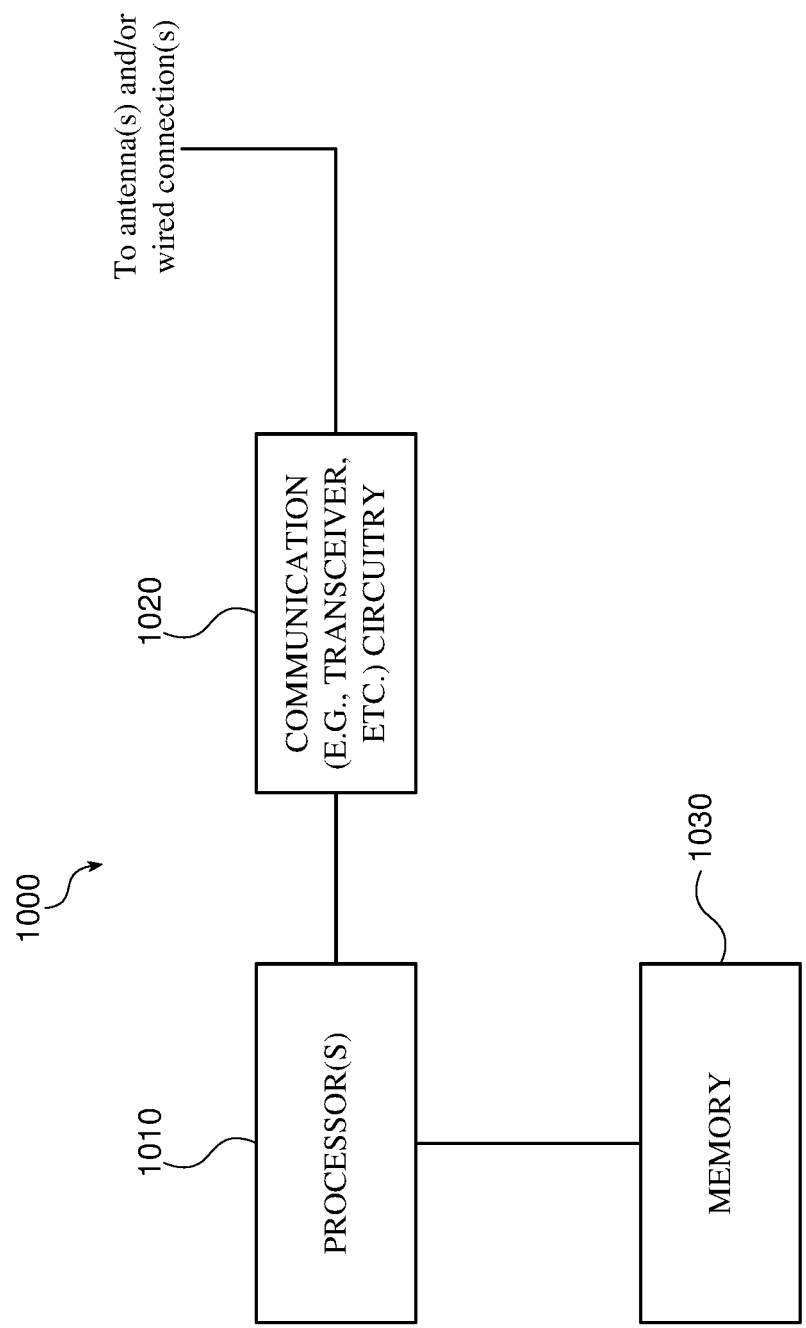
FIG. 10 illustrates a block diagram of an apparatus employable at a user equipment (UE) or other network device (e.g., IoT device), according to various aspects described herein.

Referring to FIG. 10, illustrated is a block diagram of an apparatus 1000 employable at a user equipment (UE) or other network device (e.g., IoT device), according to various aspects described herein. In some aspects, the apparatus 1000 may be included within the UE 602, the UE 702 and the UE 802 in the above aspects. However, in other aspects, the apparatus 1000 could be included within any UE associated with a wireless communication system. Apparatus 1000 can include one or more processors 1010 (e.g., one or more baseband processors such as one or more of the baseband processors discussed in connection with FIG. 15 and/or FIG. 16) comprising processing circuitry and associated interface(s) (e.g., one or more interface(s) discussed in connection with FIG. 16), transceiver circuitry 1020 (e.g., comprising part or all of RF circuitry 1506, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1030 (which can comprise any of a variety of storage mediums and can store instructions and/or data associated with one or more of processor(s) 1010 or transceiver circuitry 1020). In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 1000 can be included within a user equipment (UE). In some aspects, the processor(s) 1010, transceiver circuitry 1020, and the memory 1030 can be included in an integrated circuit (IC) or chip.

In various aspects discussed herein, signals and/or messages can be generated and output for transmission, and/or transmitted messages can be received and processed. Depending on the type of signal or message generated, outputting for transmission (e.g., by processor(s) 1010) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 1010) can comprise one or more of: identifying physical resources associated with the signal/message, detecting the signal/message, resource element group deinterleaving, demodulation, descrambling, and/or decoding.

Figure 11A:
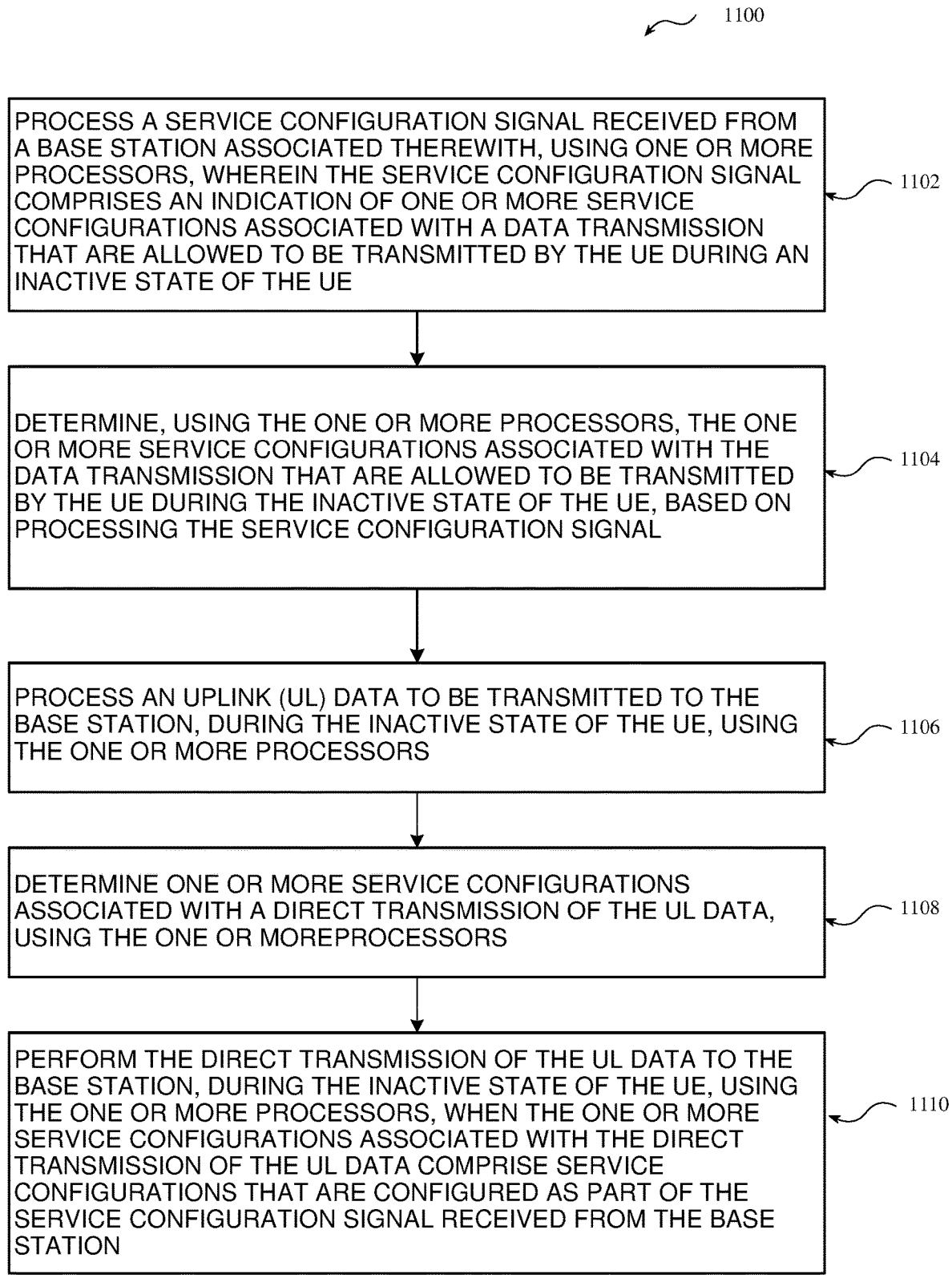
FIG. 11a illustrates a flowchart of a method for access control for a user equipment (UE), when the UE is configured to transmit in an INACTIVE state, according to one aspect of the disclosure.

FIG. 11*a* illustrates a flowchart of a method 1100 for access control for a user equipment (UE) in a wireless communication system, when the UE is configured to transmit in an INACTIVE state, according to one aspect of the disclosure. The method 1100 is explained herein with reference to the apparatus 1000 in FIG. 10. In some aspects, the apparatus 1000 could be included within the UE 602 in FIG. 6. Therefore, the method 1100 is further explained with reference to the NR system 600 in FIG. 6. At 1102, a service configuration signal (e.g., the service configuration signal 606 in FIG. 6) received from a base station (e.g., the base station 604 in FIG. 6) is processed, using the one or more processors 1010. In some aspects, the service configuration signal comprises an indication of one or more service configurations associated with a data transmission that are allowed to be transmitted by the UE during an inactive state of the UE. At 1104, the one or more service configurations associated with the data transmission that are allowed to be transmitted by the UE during the inactive state of the UE, are determined using the one or more processors 1010, based on processing the service configuration signal.

At 1106, an uplink (UL) data to be transmitted to the base station, during the inactive state of the UE is processed using the one or more processors 1010. At 1108, one or more service configurations associated with a direct transmission of the UL data is determined using the one or more processors 1010. At 1110, the direct transmission (e.g., the direct transmission 608 in FIG. 6) of the UL data to the base station is performed using the one or more processors 1010, via the transceiver circuitry 1020, during the inactive state of the UE. In some aspects, the direct transmission of the UL data to the base station is performed when the one or more service configurations associated with the direct transmission of the UL data comprise service configurations that are configured as part of the service configuration signal received from the base station.

Figure 11B:
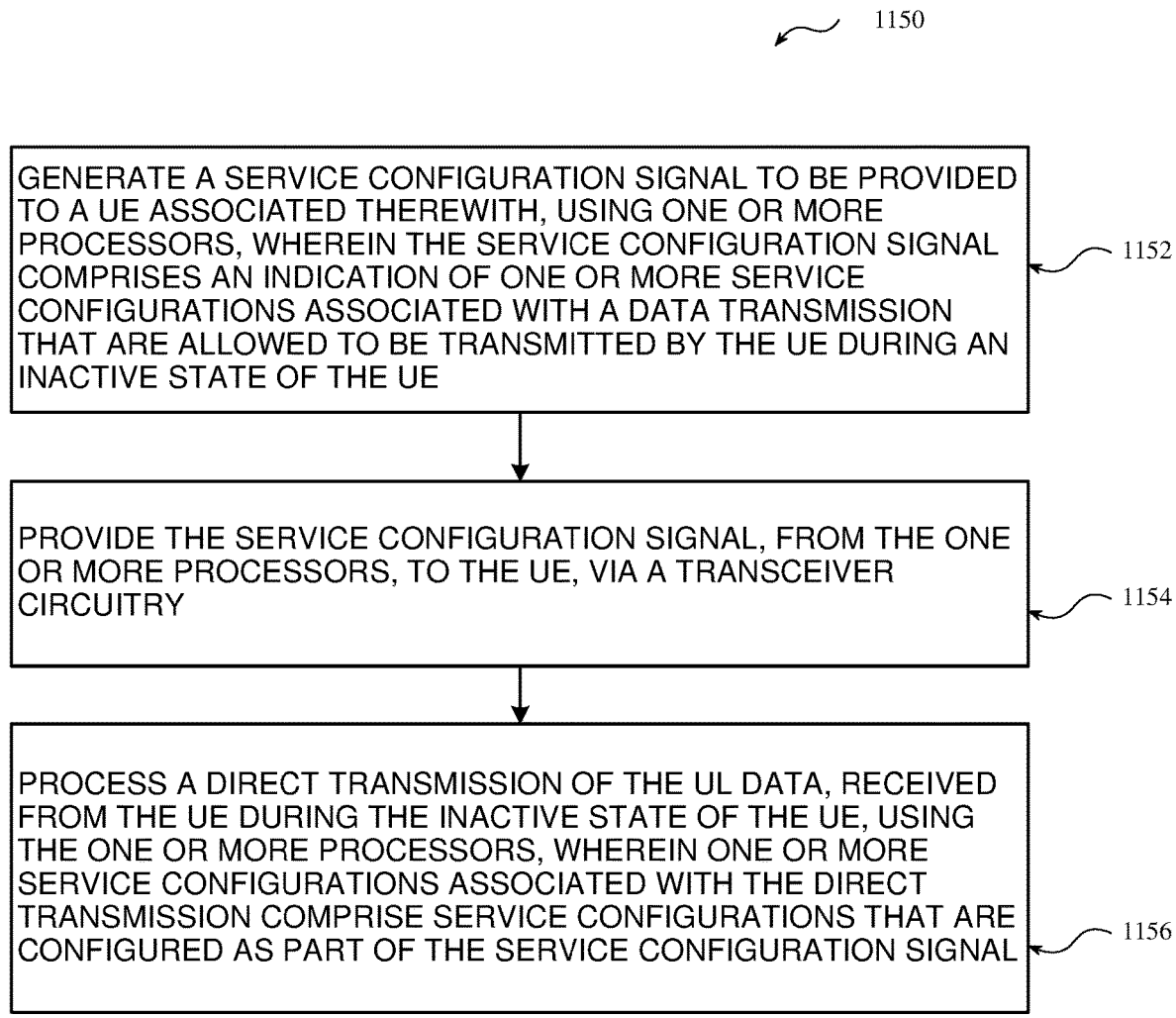
FIG. 11b illustrates a flowchart of a method for access control for a base station, when an associated UE is configured to transmit in an INACTIVE state, according to one aspect of the disclosure.

FIG. 11*b* illustrates a flowchart of a method 1150 for access control for a base station in a wireless communication system, when an associated UE is configured to transmit in an INACTIVE state, according to one aspect of the disclosure. The method 1150 is explained herein with reference to the apparatus 900 in FIG. 9. In some aspects, the apparatus 900 could be included within the base station 604 in FIG. 6. Therefore, the method 1150 is further explained with reference to the NR system 600 in FIG. 6. At 1152, a service configuration signal (e.g., the service configuration signal 606 in FIG. 6) to be provided to a UE associated therewith (e.g., the UE 602 in FIG. 6), is generated using the one or more processors 910. In some aspects, the service configuration signal comprises an indication of one or more service configurations associated with a data transmission that are allowed to be transmitted by the UE during an inactive state of the UE.

At 1154, the service configuration signal is provided from the one or more processors 910, to the UE, via the transceiver circuitry 920. At 1156, a direct transmission of the UL data (e.g., the direct transmission 608 in FIG. 6), received from the UE during the inactive state of the UE, is processed using the one or more processors 910. In some aspects, one or more service configurations associated with the direct transmission comprise service configurations that are configured as part of the service configuration signal.

Figure 12A:
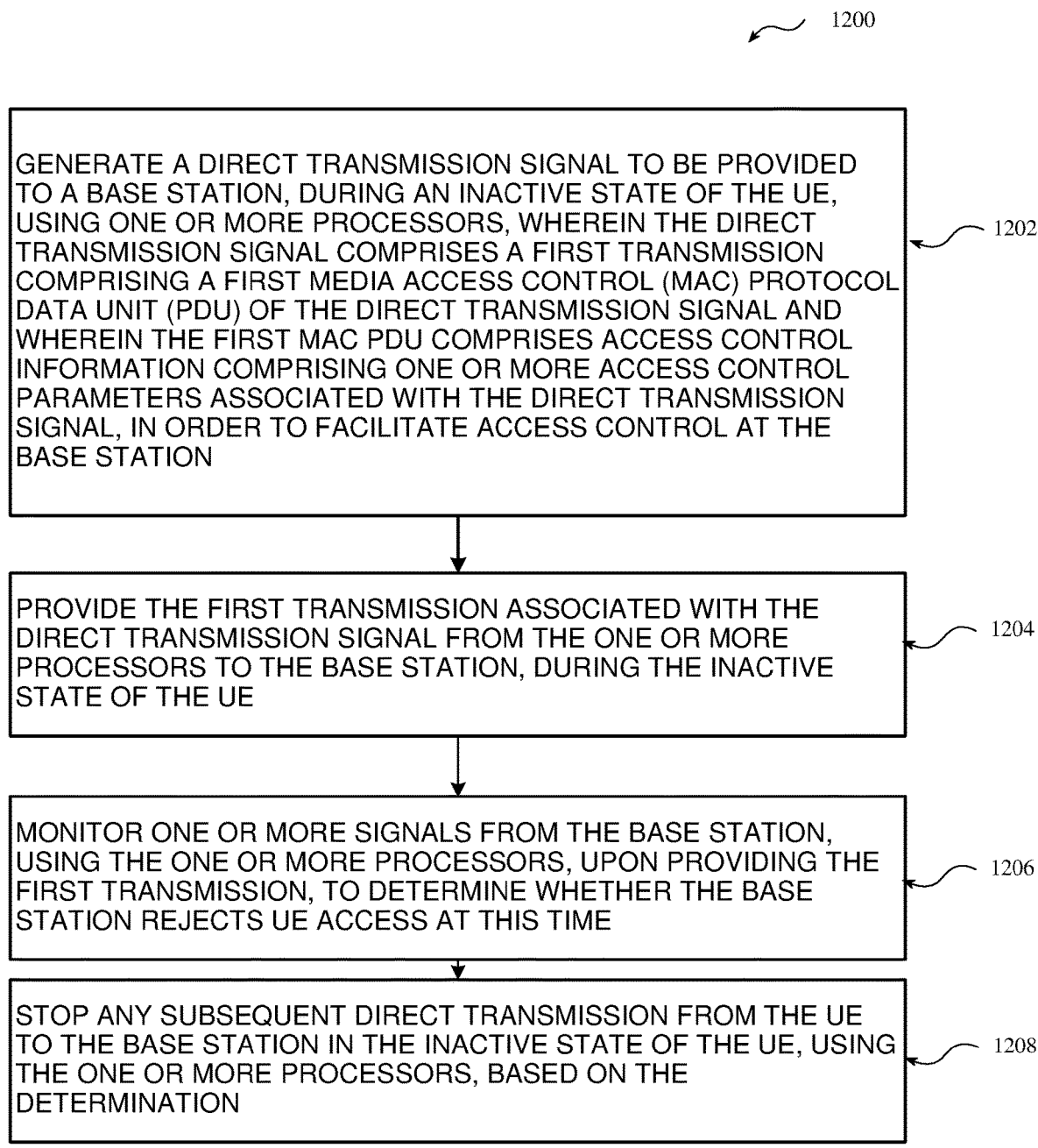
FIG. 12a illustrates a flowchart of a method for access control for a user equipment (UE), when the UE is configured to transmit in an INACTIVE state, according to another aspect of the disclosure.

FIG. 12*a* illustrates a flowchart of a method 1200 for access control for a user equipment (UE) in a wireless communication system, when the UE is configured to transmit in an INACTIVE state, according to one aspect of the disclosure. The method 1200 is explained herein with reference to the apparatus 1000 in FIG. 10. In some aspects, the apparatus 1000 could be included within the UE 702 in FIGS. 7*a*, 7*b*, 7*c*, 7*d* and 7*e*. Therefore, the method 1200 is further explained with reference to the NR system 700 in FIGS. 7*a*, 7*b*, 7*c*, 7*d* and 7*e*. At 1202, a direct transmission signal to be provided to a base station (e.g., the base station 704 in FIG. 7*a*), during an inactive state of the UE, is generated using the one or more processors 1010. In some aspects, the direct transmission signal comprises a first transmission (e.g., the first transmission 706 in FIG. 7*a*) comprising a first media access control (MAC) protocol data unit (PDU) of the direct transmission signal. In some aspects, the first mac PDU comprises access control information comprising one or more access control parameters associated with the direct transmission signal, in order to facilitate access control at the base station.

At 1204, the first transmission associated with the direct transmission signal is provided from the one or more processors 1010 to the base station, during the inactive state of the UE. At 1206, one or more signals (e.g., the AC feedback signal 722 in FIG. 7b, the delay indication signal 742 in FIG. 7c, the fallback indication signal 762 in FIG. 7d or the RRC Resume/Setup signal 782 in FIG. 7e) from the base station is monitored using the one or more processors 1010, upon providing the first transmission, to determine whether the base station rejects UE access at this time. At 1208, any subsequent direct transmission from the UE to the base station in the inactive state of the UE, is stopped using the one or more processors 1010, based on the determination.

Figure 12B:
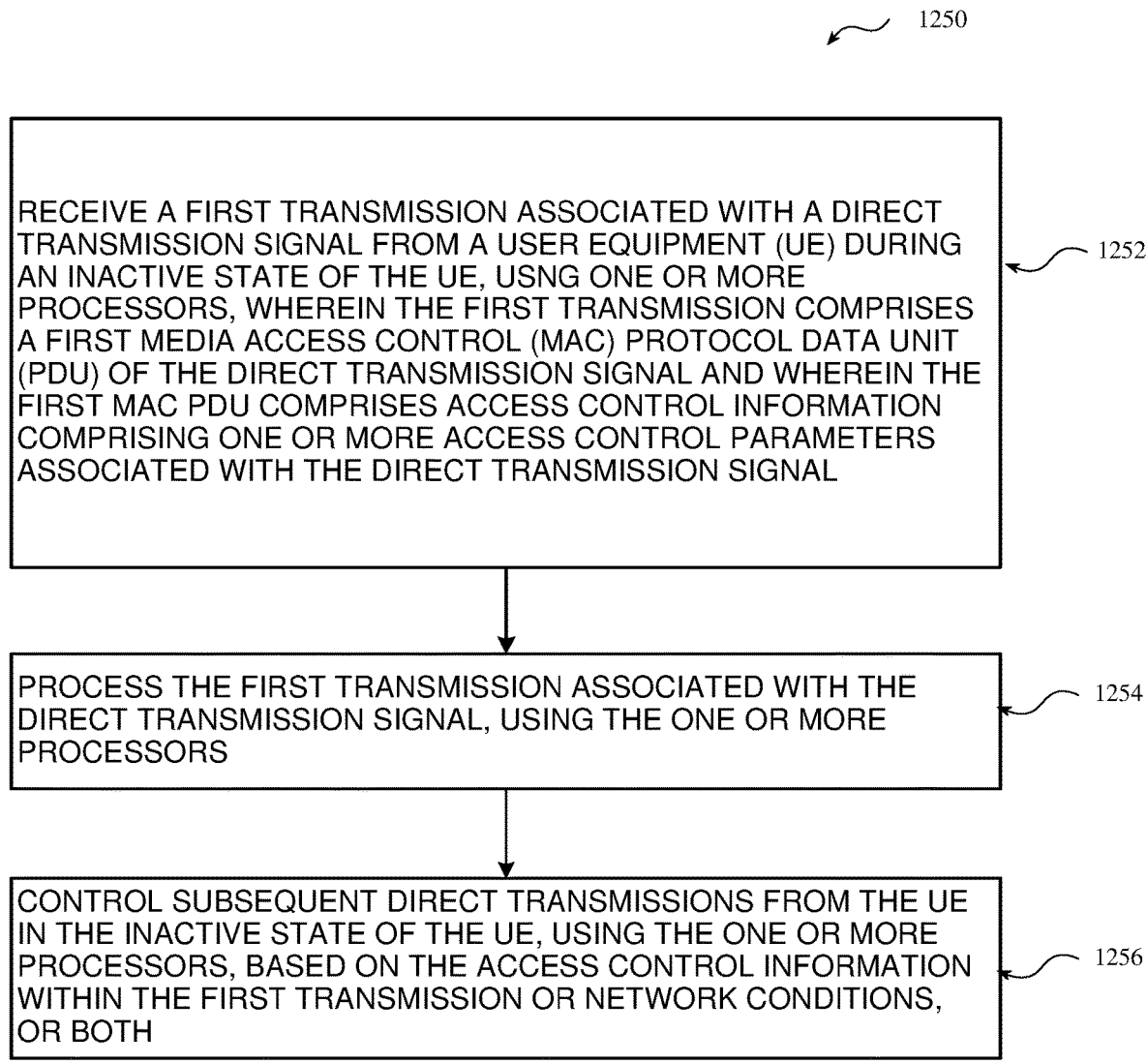
FIG. 12b illustrates a flowchart of a method for access control for a base station, when an associated UE is configured to transmit in an INACTIVE state, according to another aspect of the disclosure.

FIG. 12b illustrates a flowchart of a method 1250 for access control for a base station in a wireless communication system, when an associated UE is configured to transmit in an INACTIVE state, according to one aspect of the disclosure. The method 1250 is explained herein with reference to the apparatus 900 in FIG. 9. In some aspects, the apparatus 900 could be included within the base station 704 in FIGS. 7a, 7b, 7c, 7d and 7e. Therefore, the method 1250 is further explained with reference to the NR system 700 in FIGS. 7a, 7b, 7c, 7d and 7e. At 1252, a first transmission (e.g., the first transmission 706 in FIG. 7a) associated with a direct transmission signal is received from a UE (e.g., the UE 702 in FIG. 7a) during an inactive state of the UE, using the one or more processors 910. In some aspects, the first transmission comprises a first media access control (MAC) protocol data unit (PDU) of the direct transmission signal. In some aspects, the first MAC PDU comprises access control information comprising one or more access control parameters associated with the direct transmission signal. At 1254, the first transmission associated with the direct transmission signal, is processed using the one or more processors 910. At 1256, subsequent direct transmissions from the UE in the inactive state of the UE, is controlled using the one or more processors 910, based on the access control information within the first transmission or network conditions, or both.

Figures 1, 13A:
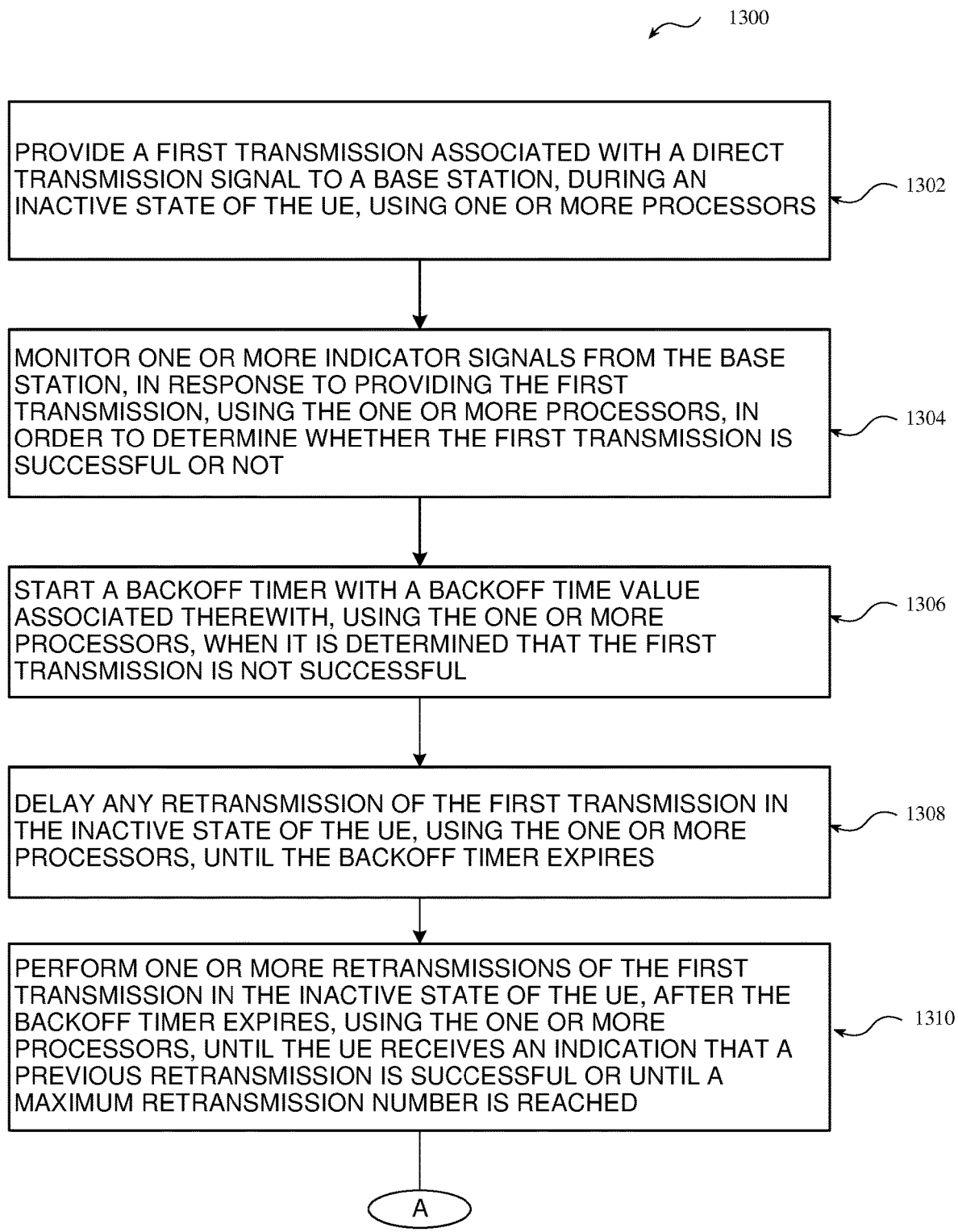
FIG. 13a illustrates a flowchart of a method for access control for a user equipment (UE), when the UE is configured to transmit in an INACTIVE state, according to yet another aspect of the disclosure.
Figures 2, 13A:
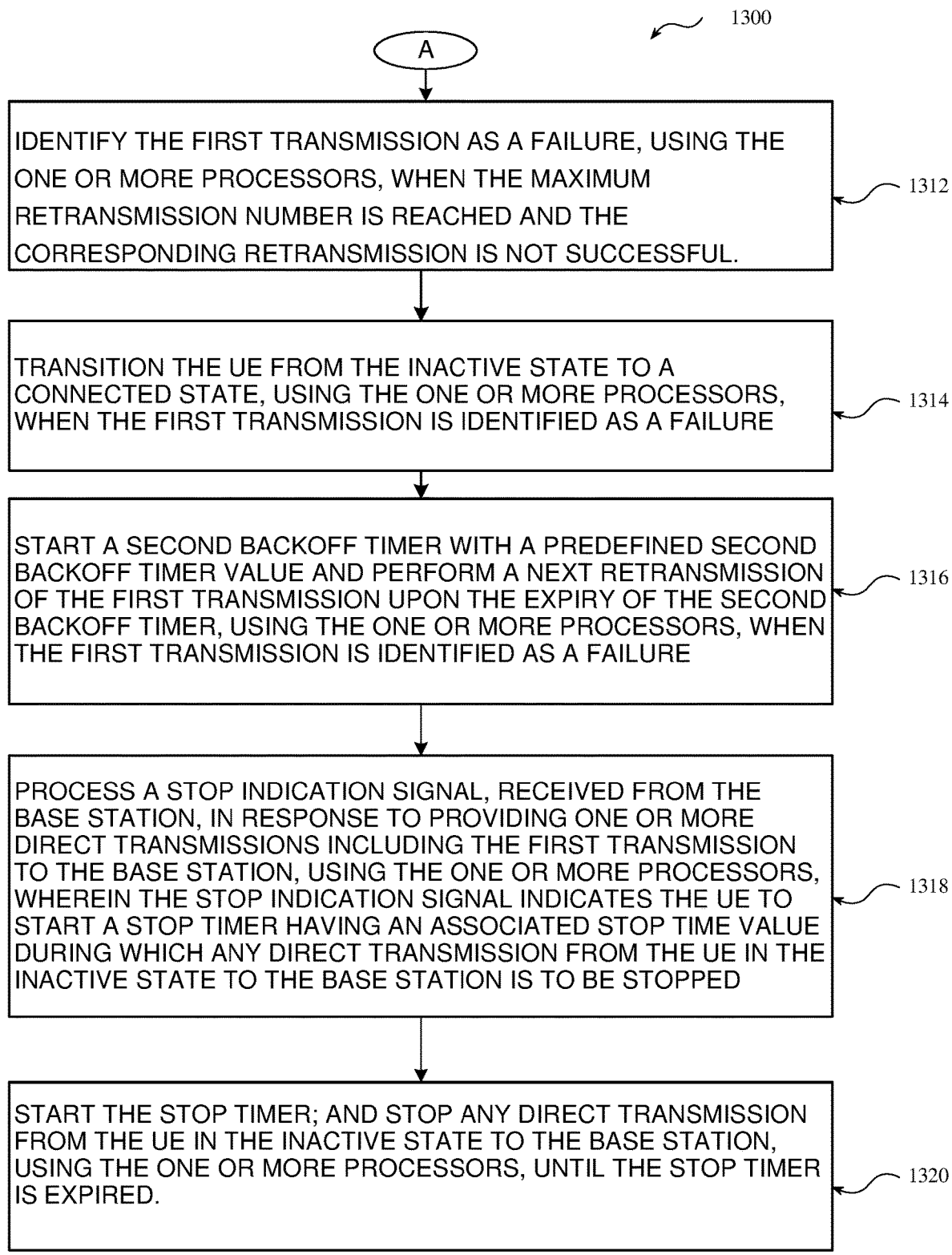

FIG. 13a illustrates a flowchart of a method 1300 for access control for a user equipment (UE) in a wireless communication system, when the UE is configured to transmit in an INACTIVE state, according to one aspect of the disclosure. The method 1300 is explained herein with reference to the apparatus 1000 in FIG. 10. In some aspects, the apparatus 1000 could be included within the UE 802 in FIGS. 8a, 8b, 8c and 8d. Therefore, the method 1300 is further explained with reference to the NR system 800 in FIGS. 8a, 8b, 8c and 8d. At 1302, a first transmission (e.g., the first transmission 806 in FIG. 8a) associated with a direct transmission signal is provided to a base station (e.g., the base station 804 in FIG. 8a), during an inactive state of the UE, using the one or more processors 1010. At 1304, one or more indicator signals (e.g., the indicator signal 808 in FIG. 8a) from the base station is monitored, in response to providing the first transmission, using the one or more processors 1010, in order to determine whether the first transmission is successful or not.

At 1306, a backoff timer with a backoff time value associated therewith, is started using the one or more processors 1010, when it is determined that the first transmission is not successful. At 1308, any retransmission of the first transmission in the inactive state of the UE, is delayed using the one or more processors 1010, until the backoff timer expires. At 1310, one or more retransmissions of the first transmission in the inactive state of the UE is performed after the backoff timer expires, using the one or more processors 1010, until the UE receives an indication that a previous retransmission is successful or until a maximum retransmission number is reached. At 1312, the first transmission is identified as a failure, using the one or more processors 1010, when the maximum retransmission number is reached and the corresponding retransmission is not successful. At 1314, the UE transitions from the INACTIVE state to a CONNECTED state (using the legacy resume procedure 822 in FIG. 8b), using the one or more processors 1010, when the first transmission is identified as a failure. Alternately, at 1316, a second backoff timer (e.g., the second backoff timer 846 in FIG. 8c) with a predefined second backoff timer value is started using the one or more processors 1010 and a next retransmission (e.g., the retransmission 842 in FIG. 8c) of the first transmission is performed upon the expiry of the second backoff timer, using the one or more processors 1010, when the first transmission is identified as a failure. In some aspects, the one or more processors 1010 is configured to perform one or more retransmissions until a predefined maximum number of retransmissions is reached. When the maximum number of retransmissions is reached and the corresponding retransmission is not successful, the one or more processors 1010 may trigger a legacy resume procedure (e.g., the legacy resume procedure 844 in FIG. 8c) or move to an IDLE state.

At 1318, a stop indication signal (e.g., the stop indication signal 866 in FIG. 8d) received from the base station, in response to providing one or more direct transmissions including the first transmission to the base station, is processed using the one or more processors 1010. In some aspects, the stop indication signal indicates the UE to start a stop timer having an associated stop time value during which any direct transmission from the UE in the INACTIVE state to the base station is to be stopped. At 1320, the stop timer is started and any direct transmission from the UE in the inactive state to the base station is stopped using the one or more processors 1010, until the stop timer is expired.

Figure 13B:
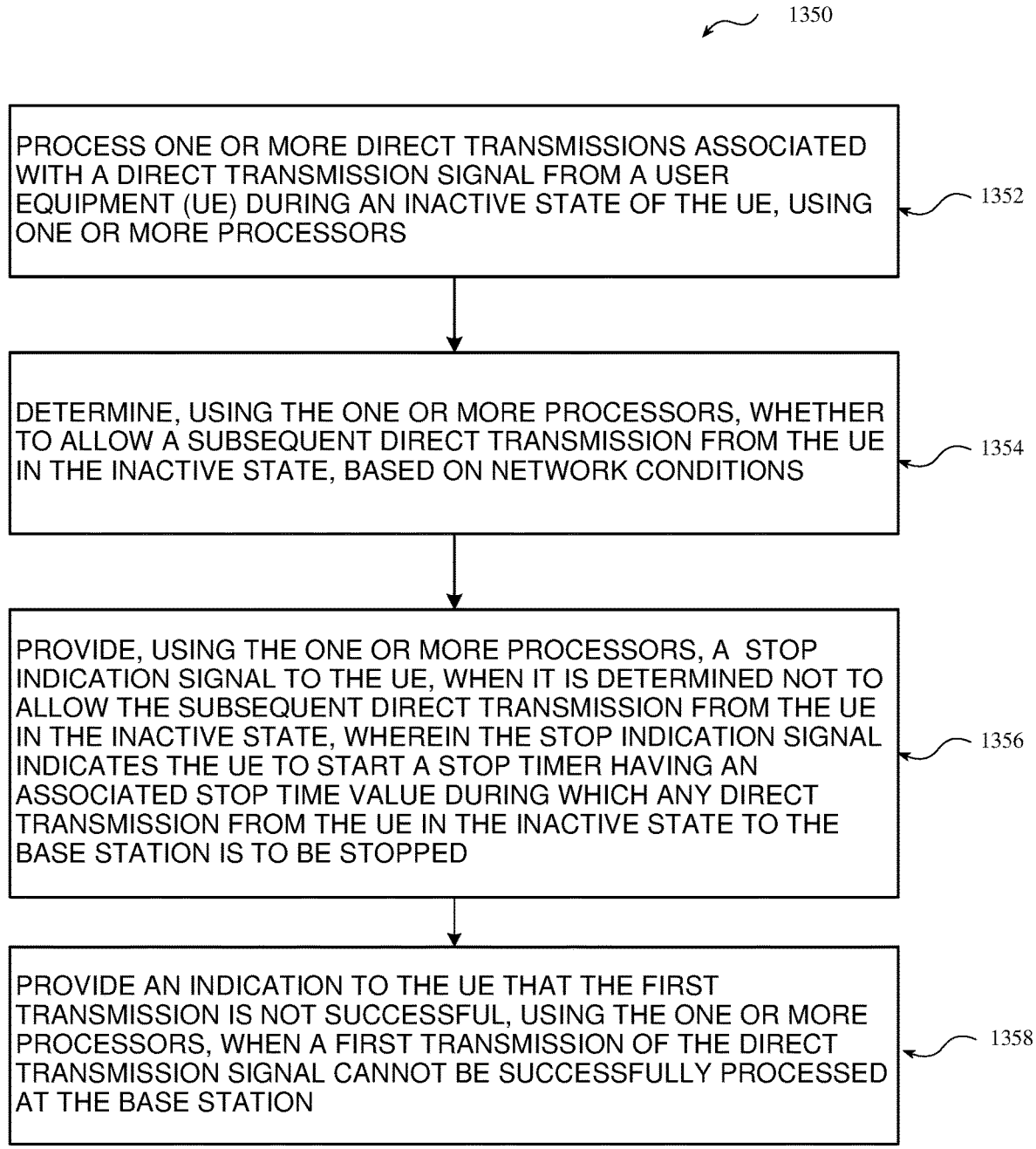
FIG. 13b illustrates a flowchart of a method for access control for a base station, when an associated UE is configured to transmit in an INACTIVE state, according to yet another aspect of the disclosure.

FIG. 13b illustrates a flowchart of a method 1350 for access control for a base station in a wireless communication system, when an associated UE is configured to transmit in an INACTIVE state, according to one aspect of the disclosure. The method 1350 is explained herein with reference to the apparatus 900 in FIG. 9. In some aspects, the apparatus 900 could be included within the base station 804 in FIGS. 8a, 8b, 8c and 8d. Therefore, the method 1350 is further explained with reference to the NR system 800 in FIGS. 8a, 8b, 8c and 8d. At 1352, one or more direct transmissions (e.g., the direct transmissions 862 and 864 in FIG. 8d) associated with a direct transmission signal from a UE (e.g., the UE 802 in FIG. 8d) in an inactive state is processed using the one or more processors 910. At 1354, a determination whether to allow a subsequent direct transmission from the UE in the inactive state, is made using the one or more processors 910, based on network conditions.

At 1356, a stop indication signal (e.g., the stop indication signal 866 in FIG. 8d) is provided to the UE, using the one or more processors 910, when it is determined not to allow the subsequent direct transmission from the UE in the inactive state. In some aspects, the stop indication signal indicates the UE to start a stop timer having an associated stop time value during which any direct transmission from the UE in the inactive state to the base station is to be stopped. At 1358, an indication that a first transmission is not successful is provided to the UE using the one or more processors 910, when a first transmission of the direct transmission signal cannot be successfully processed at the base station.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or aspects of the disclosure herein. Also, one or more of the acts depicted herein may be carried out in one or more separate acts and/or phases.

Figure 14:
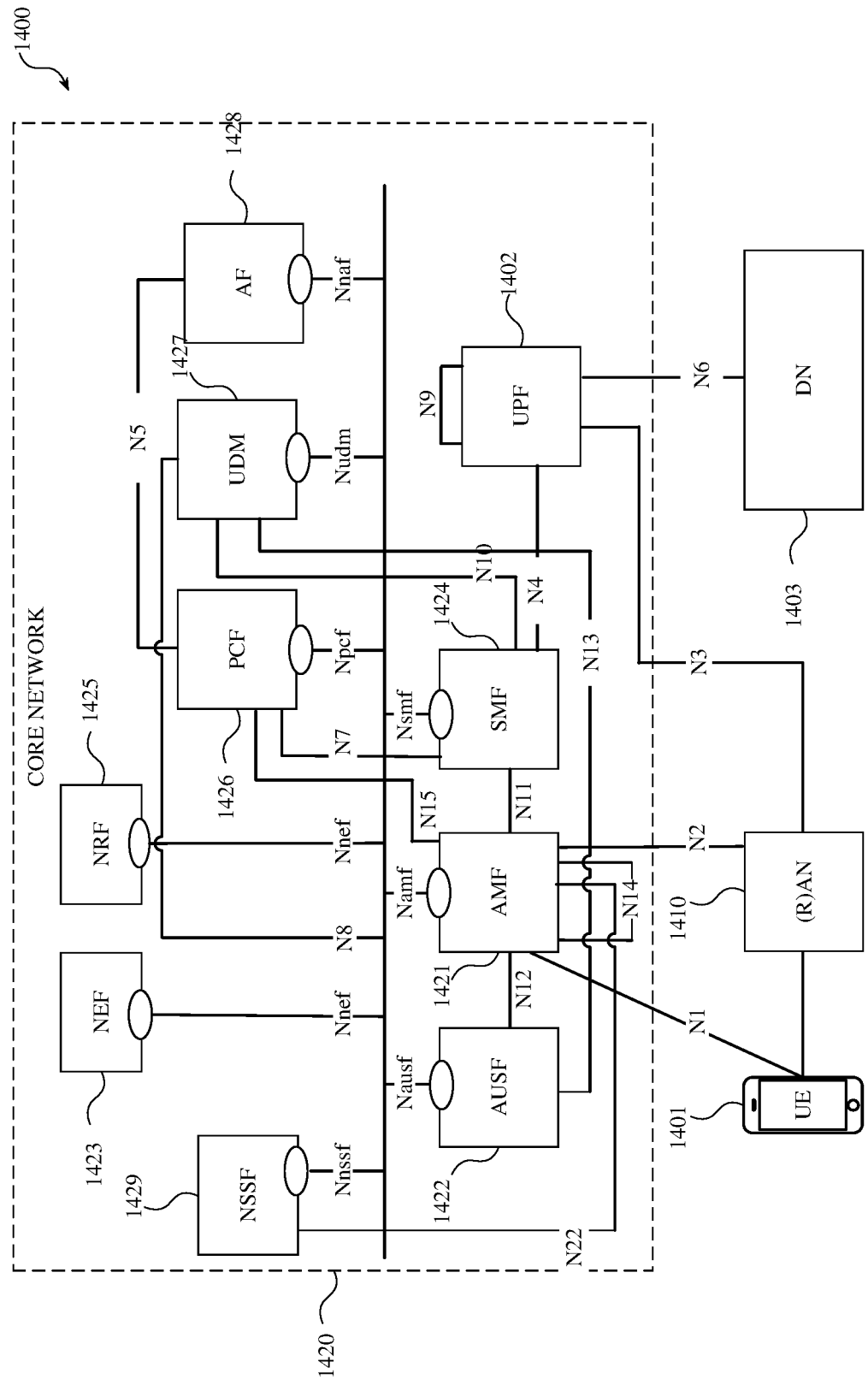
FIG. 14 illustrates an architecture of a system including a Core Network (CN), for example a Fifth Generation (5G) CN (5GC), in accordance with various aspects.

Aspects described herein can be implemented into a system using any suitably configured hardware and/or software. FIG. 14 illustrates an architecture of a system 1400 including a Core Network (CN) 1420, for example a Fifth Generation (5G) CN (5GC), in accordance with various aspects. The system 1400 is shown to include a UE 1401, which can be the same or similar to one or more other UEs discussed herein; a Third Generation Partnership Project (3GPP) Radio Access Network (Radio AN or RAN) or other (e.g., non-3GPP) AN, (R)AN 1410, which can include one or more RAN nodes (e.g., Evolved Node B(s) (eNB(s)), next generation Node B(s) (gNB(s), and/or other nodes) or other nodes or access points; and a Data Network (DN) 1403, which can be, for example, operator services, Internet access or third party services; and a Fifth Generation Core Network (5GC) 1420. The 5GC 1420 can comprise one or more of the following functions and network components: an Authentication Server Function (AUSF) 1422; an Access and Mobility Management Function (AMF) 1421; a Session Management Function (SMF) 1424; a Network Exposure Function (NEF) 1423; a Policy Control Function (PCF) 1426; a Network Repository Function (NRF) 1425; a Unified Data Management (UDM) 1427; an Application Function (AF) 1428; a User Plane (UP) Function (UPF) 1402; and a Network Slice Selection Function (NSSF) 1429.

The UPF 1402 can act as an anchor point for intra-RAT and inter-RAT mobility, an external Protocol Data Unit (PDU) session point of interconnect to DN 1403, and a branching point to support multi-homed PDU session. The UPF 1402 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1402 can include an uplink classifier to support routing traffic flows to a data network. The DN 1403 can represent various network operator services, Internet access, or third-party services. DN 1403 can include, or be similar to, an application server. The UPF 1402 can interact with the SMF 1424 via an N4 reference point between the SMF 1424 and the UPF 1402.

The AUSF 1422 can store data for authentication of UE 1401 and handle authentication-related functionality. The AUSF 1422 can facilitate a common authentication framework for various access types. The AUSF 1422 can communicate with the AMF 1421 via an N12 reference point between the AMF 1421 and the AUSF 1422; and can communicate with the UDM 1427 via an N13 reference point between the UDM 1427 and the AUSF 1422. Additionally, the AUSF 1422 can exhibit an Nausf service-based interface.

The AMF 1421 can be responsible for registration management (e.g., for registering UE 1401, etc.), connection management, reachability management, mobility management, and lawful interception of AMF-related events, and access authentication and authorization. The AMF 1421 can be a termination point for the an N11 reference point between the AMF 1421 and the SMF 1424. The AMF 1421 can provide transport for SM messages between the UE 1401 and the SMF 1424, and act as a transparent proxy for routing SM messages. AMF 1421 can also provide transport for SMS messages between UE 1401 and a Short Message Service (SMS) Function (SMSF) (not shown in FIG. 14). AMF 1421 can act as SEcurity Anchor Function (SEAF), which can include interaction with the AUSF 1422 and the UE 1401 and/or receipt of an intermediate key that was established as a result of the UE 1401 authentication process. Where Universal Subscriber Identity Module (USIM) based authentication is used, the AMF 1421 can retrieve the security material from the AUSF 1422. AMF 1421 can also include a Single-Connection Mode (SCM) function, which receives a key from the SEA that it uses to derive access-network specific keys. Furthermore, AMF 1421 can be a termination point of a RAN Control Plane (CP) interface, which can include or be an N2 reference point between the (R)AN 1410 and the AMF 1421; and the AMF 1421 can be a termination point of Non Access Stratum (NAS) (N1) signaling, and perform NAS ciphering and integrity protection.

AMF 1421 can also support NAS signaling with a UE 1401 over an Non-3GPP (N3) Inter Working Function (IWF) interface. The N3IWF can be used to provide access to untrusted entities. N3IWF can be a termination point for the N2 interface between the (R)AN 1410 and the AMF 1421 for the control plane, and can be a termination point for the N3 reference point between the (R)AN 1410 and the UPF 1402 for the user plane. As such, the AMF 1421 can handle N2 signaling from the SMF 1424 and the AMF 1421 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 1401 and AMF 1421 via an N1 reference point between the UE 1401 and the AMF 1421, and relay uplink and downlink user-plane packets between the UE 1401 and UPF 1402. The N3IWF also provides mechanisms for IPsec tunnel establishment with the UE 1401. The AMF 1421 can exhibit an Namf service-based interface, and can be a termination point for an N14 reference point between two AMFs 1421 and an N17 reference point between the AMF 1421 and a 5G Equipment Identity Register (5G-EIR) (not shown in FIG. 14).

The UE 1401 can be registered with the AMF 1421 in order to receive network services. Registration Management (RM) is used to register or deregister the UE 1401 with the network (e.g., AMF 1421), and establish a UE context in the network (e.g., AMF 1421). The UE 1401 can operate in an RM-REGISTERED state or an RM-DEREGISTERED state. In the RM-DEREGISTERED state, the UE 1401 is not registered with the network, and the UE context in AMF 1421 holds no valid location or routing information for the UE 1401 so the UE 1401 is not reachable by the AMF 1421. In the RM-REGISTERED state, the UE 1401 is registered with the network, and the UE context in AMF 1421 can hold a valid location or routing information for the UE 1401 so the UE 1401 is reachable by the AMF 1421. In the RM-REGISTERED state, the UE 1401 can perform mobility Registration Update procedures, perform periodic Registration Update procedures triggered by expiration of the periodic update timer (e.g., to notify the network that the UE 1401 is still active), and perform a Registration Update procedure to update UE capability information or to re-negotiate protocol parameters with the network, among others.

The AMF 1421 can store one or more RM contexts for the UE 1401, where each RM context is associated with a specific access to the network. The RM context can be a data structure, database object, etc. that indicates or stores, inter alia, a registration state per access type and the periodic update timer. The AMF 1421 can also store a 5GC Mobility Management (MM) context that can be the same or similar to an (Enhanced Packet System (EPS))MM ((E)MM) context. In various aspects, the AMF 1421 can store a Coverage Enhancement (CE) mode B Restriction parameter of the UE 1401 in an associated MM context or RM context. The AMF 1421 can also derive the value, when needed, from the UE's usage setting parameter already stored in the UE context (and/or MM/RM context).

Connection Management (CM) can be used to establish and release a signaling connection between the UE 1401 and the AMF 1421 over the N1 interface. The signaling connection is used to enable NAS signaling exchange between the UE 1401 and the CN 1420, and comprises both the signaling connection between the UE and the AN (e.g., RRC connection or UE-N3IWF connection for non-3GPP access) and the N2 connection for the UE 1401 between the AN (e.g., RAN 1410) and the AMF 1421. The UE 1401 can operate in one of two CM states, CM-IDLE mode or CM-CONNECTED mode. When the UE 1401 is operating in the CM-IDLE state/mode, the UE 1401 may have no NAS signaling connection established with the AMF 1421 over the N1 interface, and there can be (R)AN 1410 signaling connection (e.g., N2 and/or N3 connections) for the UE 1401. When the UE 1401 is operating in the CM-CONNECTED state/mode, the UE 1401 can have an established NAS signaling connection with the AMF 1421 over the N1 interface, and there can be a (R)AN 1410 signaling connection (e.g., N2 and/or N3 connections) for the UE 1401. Establishment of an N2 connection between the (R)AN 1410 and the AMF 1421 can cause the UE 1401 to transition from CM-IDLE mode to CM-CONNECTED mode, and the UE 1401 can transition from the CM-CONNECTED mode to the CM-IDLE mode when N2 signaling between the (R)AN 1410 and the AMF 1421 is released.

The SMF 1424 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1401 and a data network (DN) 1403 identified by a Data Network Name (DNN). PDU sessions can be established upon UE 1401 request, modified upon UE 1401 and 5GC 1420 request, and released upon UE 1401 and 5GC 1420 request using NAS SM signaling exchanged over the N1 reference point between the UE 1401 and the SMF 1424. Upon request from an application server, the 5GC 1420 can trigger a specific application in the UE 1401. In response to receipt of the trigger message, the UE 1401 can pass the trigger message (or relevant parts/information of the trigger message) to one or more identified applications in the UE 1401. The identified application(s) in the UE 1401 can establish a PDU session to a specific DNN. The SMF 1424 can check whether the UE 1401 requests are compliant with user subscription information associated with the UE 1401. In this regard, the SMF 1424 can retrieve and/or request to receive update notifications on SMF 1424 level subscription data from the UDM 1427.

The SMF 1424 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1424 can be included in the system 1400, which can be between another SMF 1424 in a visited network and the SMF 1424 in the home network in roaming scenarios. Additionally, the SMF 1424 can exhibit the Nsmf service-based interface.

The NEF 1423 can provide means for securely exposing the services and capabilities provided by 3GPP network functions for third party, internal exposure/re-exposure, Application Functions (e.g., AF 1428), edge computing or fog computing systems, etc. In such aspects, the NEF 1423 can authenticate, authorize, and/or throttle the AFs. NEF 1423 can also translate information exchanged with the AF 1428 and information exchanged with internal network functions. For example, the NEF 1423 can translate between an AF-Service-Identifier and an internal 5GC information. NEF 1423 can also receive information from other network functions (NFs) based on exposed capabilities of other network functions. This information can be stored at the NEF 1423 as structured data, or at a data storage NF using standardized interfaces. The stored information can then be re-exposed by the NEF 1423 to other NFs and AFs, and/or used for other purposes such as analytics. Additionally, the NEF 1423 can exhibit an Nnef service-based interface.

The NRF 1425 can support service discovery functions, receive NF discovery requests from NF instances, and provide the information of the discovered NF instances to the NF instances. NRF 1425 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1425 can exhibit the Nnrf service-based interface.

The PCF 1426 can provide policy rules to control plane function(s) to enforce them, and can also support unified policy framework to govern network behavior. The PCF 1426 can also implement an FE to access subscription information relevant for policy decisions in a UDR of the UDM 1427. The PCF 1426 can communicate with the AMF 1421 via an N15 reference point between the PCF 1426 and the AMF 1421, which can include a PCF 1426 in a visited network and the AMF 1421 in case of roaming scenarios. The PCF 1426 can communicate with the AF 1428 via an N5 reference point between the PCF 1426 and the AF 1428; and with the SMF 1424 via an N7 reference point between the PCF 1426 and the SMF 1424. The system 1400 and/or CN 1420 can also include an N24 reference point between the PCF 1426 (in the home network) and a PCF 1426 in a visited network. Additionally, the PCF 1426 can exhibit an Npcf service-based interface.

The UDM 1427 can handle subscription-related information to support the network entities' handling of communication sessions, and can store subscription data of UE 1401. For example, subscription data can be communicated between the UDM 1427 and the AMF 1421 via an N8 reference point between the UDM 1427 and the AMF. The UDM 1427 can include two parts, an application Functional Entity (FE) and a Unified Data Repository (UDR) (the FE and UDR are not shown in FIG. 1). The UDR can store subscription data and policy data for the UDM 1427 and the PCF 1426, and/or structured data for exposure and application data (including Packet Flow Descriptions (PFDs) for application detection, application request information for multiple UEs 1401) for the NEF 1423. The Nudr service-based interface can be exhibited by the UDR 221 to allow the UDM 1427, PCF 1426, and NEF 1423 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1424 via an N10 reference point between the UDM 1427 and the SMF 1424. UDM 1427 can also support SMS management, wherein an SMS-FE implements similar application logic as discussed elsewhere herein. Additionally, the UDM 1427 can exhibit the Nudm service-based interface.

The AF 1428 can provide application influence on traffic routing, provide access to NEF 1423, and interact with the policy framework for policy control. 5GC 1420 and AF 1428 can provide information to each other via NEF 1423, which can be used for edge computing implementations. In such implementations, the network operator and third party services can be hosted close to the UE 1401 access point of attachment to achieve an efficient service delivery through the reduced end-to-end latency and load on the transport network. For edge computing implementations, the 5GC can select a UPF 1402 close to the UE 1401 and execute traffic steering from the UPF 1402 to DN 1403 via the N6 interface. This can be based on the UE subscription data, UE location, and information provided by the AF 1428. In this way, the AF 1428 can influence UPF (re)selection and traffic routing. Based on operator deployment, when AF 1428 is considered to be a trusted entity, the network operator can permit AF 1428 to interact directly with relevant NFs. Additionally, the AF 1428 can exhibit an Naf service-based interface.

The NSSF 1429 can select a set of network slice instances serving the UE 1401. The NSSF 1429 can also determine allowed Network Slice Selection Assistance Information (NSSAI) and the mapping to the subscribed Single NSSAIs (S-NSSAIs), as appropriate. The NSSF 1429 can also determine the AMF set to be used to serve the UE 1401, or a list of candidate AMF(s) 1421 based on a suitable configuration and possibly by querying the NRF 1425. The selection of a set of network slice instances for the UE 1401 can be triggered by the AMF 1421 with which the UE 1401 is registered by interacting with the NSSF 1429, which can lead to a change of AMF 1421. The NSSF 1429 can interact with the AMF 1421 via an N22 reference point between AMF 1421 and NSSF 1429; and can communicate with another NSSF 1429 in a visited network via an N31 reference point (not shown in FIG. 14). Additionally, the NSSF 1429 can exhibit an Nnssf service-based interface.

As discussed previously, the CN 1420 can include an SMSF, which can be responsible for SMS subscription checking and verification, and relaying SM messages to/from the UE 1401 to/from other entities, such as an SMS-Gateway Mobile services Switching Center (GMSC)/Inter-Working MSC (IWMSC)/SMS-router. The SMSF can also interact with AMF 1421 and UDM 1427 for a notification procedure that the UE 1401 is available for SMS transfer (e.g., set a UE not reachable flag, and notifying UDM 1427 when UE 1401 is available for SMS).

The CN 1420 can also include other elements that are not shown in FIG. 14, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 14 for clarity. In one example, the CN 1420 can include an Nx interface, which is an inter-CN interface between the MME (e.g., a non-5G MME) and the AMF 1421 in order to enable interworking between CN 1420 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 15:
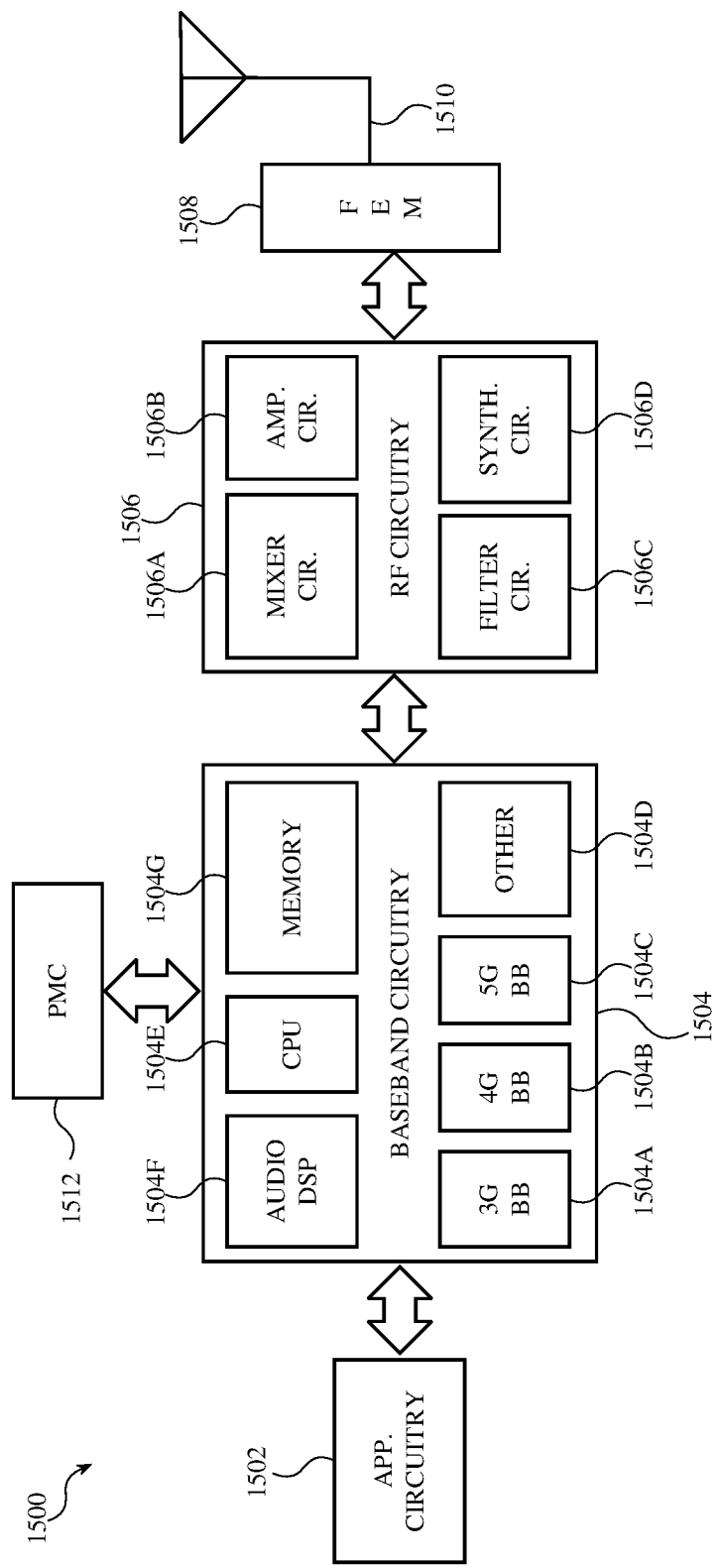
FIG. 15 illustrates example components of a device in accordance with some aspects.

FIG. 15 illustrates example components of a device 1500 in accordance with some aspects. In some aspects, the device 1500 can include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some aspects, the device 1500 can include fewer elements (e.g., a RAN node may not utilize application circuitry 1502, and instead include a processor/controller to process IP data received from a CN such as 5GC 1420 or an Evolved Packet Core (EPC)). In some aspects, the device

1500 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some aspects, processors of application circuitry 1502 can process IP data packets received from an EPC.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband circuitry 1504 can interface with the application circuitry 1502 for generation and processing of the baseband signals and for controlling operations of the RF circuitry 1506. For example, in some aspects, the baseband circuitry 1504 can include a third generation (3G) baseband processor 1504A, a fourth generation (4G) baseband processor 1504B, a fifth generation (5G) baseband processor 1504C, or other baseband processor(s) 1504D for other existing generations, generations in development or to be developed in the future (e.g., second generation (2G), sixth generation (6G), etc.). The baseband circuitry 1504 (e.g., one or more of baseband processors 1504A-D) can handle various radio control functions that enable communication with one or more radio networks via the RF circuitry 1506. In other aspects, some or all of the functionality of baseband processors 1504A-D can be included in modules stored in the memory 1504G and executed via a Central Processing Unit (CPU) 1504E. The radio control functions can include, but are not limited to, signal modulation/demodulation, encoding/decoding, radio frequency shifting, etc. In some aspects, modulation/demodulation circuitry of the baseband circuitry 1504 can include Fast-Fourier Transform (FFT), precoding, or constellation mapping/demapping functionality. In some aspects, encoding/decoding circuitry of the baseband circuitry 1504 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1504 can include one or more audio digital signal processor(s) (DSP) 1504F. The audio DSP(s) 1504F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1504 and the application circuitry 1502 can be implemented together such as, for example, on a system on a chip (SOC).

In some aspects, the baseband circuitry 1504 can provide for communication compatible with one or more radio technologies. For example, in some aspects, the baseband circuitry 1504 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 1504 is configured to support radio communications of more than one wireless protocol can be referred to as multi-mode baseband circuitry.

RF circuitry 1506 can enable communication with wireless networks using modulated electromagnetic radiation through a non-solid medium. In various aspects, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some aspects, the receive signal path of the RF circuitry 1506 can include mixer circuitry 1506a, amplifier circuitry 1506b and filter circuitry 1506c. In some aspects, the transmit signal path of the RF circuitry 1506 can include filter circuitry 1506c and mixer circuitry 1506a. RF circuitry 1506 can also include synthesizer circuitry 1506d for synthesizing a frequency for use by the mixer circuitry 1506a of the receive signal path and the transmit signal path. In some aspects, the mixer circuitry 1506a of the receive signal path can be configured to down-convert RF signals received from the FEM circuitry 1508 based on the synthesized frequency provided by synthesizer circuitry 1506d. The amplifier circuitry 1506b can be configured to amplify the down-converted signals and the filter circuitry 1506c can be a low-pass filter (LPF) or band-pass filter (BPF) configured to remove unwanted signals from the down-converted signals to generate output baseband signals. Output baseband signals can be provided to the baseband circuitry 1504 for further processing. In some aspects, the output baseband signals can be zero-frequency baseband signals, although this is not a requirement. In some aspects, mixer circuitry 1506a of the receive signal path can comprise passive mixers, although the scope of the aspects is not limited in this respect.

In some aspects, the mixer circuitry 1506a of the transmit signal path can be configured to up-convert input baseband signals based on the synthesized frequency provided by the synthesizer circuitry 1506d to generate RF output signals for the FEM circuitry 1508. The baseband signals can be provided by the baseband circuitry 1504 and can be filtered by filter circuitry 1506c.

In some aspects, the mixer circuitry 1506a of the receive signal path and the mixer circuitry 1506a of the transmit signal path can include two or more mixers and can be arranged for quadrature downconversion and upconversion, respectively. In some aspects, the mixer circuitry 1506a of the receive signal path and the mixer circuitry 1506a of the transmit signal path can include two or more mixers and can be arranged for image rejection (e.g., Hartley image rejection). In some aspects, the mixer circuitry 1506a of the receive signal path and the mixer circuitry 1506a can be arranged for direct downconversion and direct upconversion, respectively. In some aspects, the mixer circuitry 1506a of the receive signal path and the mixer circuitry 1506a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1506 can include analog-to-digital converter (ADC) and digital-to-analog converter (DAC) circuitry and the baseband circuitry 1504 can include a digital baseband interface to communicate with the RF circuitry 1506.

In some dual-mode aspects, a separate radio IC circuitry can be provided for processing signals for each spectrum, although the scope of the aspects is not limited in this respect.

In some aspects, the synthesizer circuitry 1506d can be a fractional-N synthesizer or a fractional N/N+1 synthesizer, although the scope of the aspects is not limited in this respect as other types of frequency synthesizers can be suitable. For example, synthesizer circuitry 1506d can be a delta-sigma synthesizer, a frequency multiplier, or a synthesizer comprising a phase-locked loop with a frequency divider.

The synthesizer circuitry 1506d can be configured to synthesize an output frequency for use by the mixer circuitry 1506a of the RF circuitry 1506 based on a frequency input and a divider control input. In some aspects, the synthesizer circuitry 1506d can be a fractional N/N+1 synthesizer.

In some aspects, frequency input can be provided by a voltage controlled oscillator (VCO), although that is not a requirement. Divider control input can be provided by either the baseband circuitry 1504 or the application circuitry 1502 depending on the desired output frequency. In some aspects, a divider control input (e.g., N) can be determined from a look-up table based on a channel indicated by the application circuitry 1502.

Synthesizer circuitry 1506d of the RF circuitry 1506 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1506d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 1506 can include an IQ/polar converter.

FEM circuitry 1508 can include a receive signal path which can include circuitry configured to operate on RF signals received from one or more antennas 1510, amplify the received signals and provide the amplified versions of the received signals to the RF circuitry 1506 for further processing. FEM circuitry 1508 can also include a transmit signal path which can include circuitry configured to amplify signals for transmission provided by the RF circuitry 1506 for transmission by one or more of the one or more antennas 1510. In various aspects, the amplification through the transmit or receive signal paths can be done solely in the RF circuitry 1506, solely in the FEM circuitry 1508, or in both the RF circuitry 1506 and the FEM circuitry 1508.

In some aspects, the FEM circuitry 1508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1506). The transmit signal path of the FEM circuitry 1508 can include a power amplifier (PA) to amplify input RF signals (e.g., provided by RF circuitry 1506), and one or more filters to generate RF signals for subsequent transmission (e.g., by one or more of the one or more antennas 1510).

In some aspects, the PMC 1512 can manage power provided to the baseband circuitry 1504. In particular, the PMC 1512 can control power-source selection, voltage scaling, battery charging, or DC-to-DC conversion. The PMC 1512 can often be included when the device 1500 is capable of being powered by a battery, for example, when the device is included in a UE. The PMC 1512 can increase the power conversion efficiency while providing desirable implementation size and heat dissipation characteristics.

While FIG. 15 shows the PMC 1512 coupled only with the baseband circuitry 1504. However, in other aspects, the PMC 1512 may be additionally or alternatively coupled with, and perform similar power management operations for, other components such as, but not limited to, application circuitry 1502, RF circuitry 1506, or FEM circuitry 1508.

In some aspects, the PMC 1512 can control, or otherwise be part of, various power saving mechanisms of the device 1500. For example, if the device 1500 is in an RRC_Connected state, where it is still connected to the RAN node as it expects to receive traffic shortly, then it can enter a state known as Discontinuous Reception Mode (DRX) after a period of inactivity. During this state, the device 1500 can power down for brief intervals of time and thus save power.

If there is no data traffic activity for an extended period of time, then the device 1500 can transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1502 and processors of the baseband circuitry 1504 can be used to execute elements of one or more instances of a protocol stack. For example, processors of the baseband circuitry 1504, alone or in combination, can be used execute Layer 3, Layer 2, or Layer 1 functionality, while processors of the application circuitry 1502 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 16:
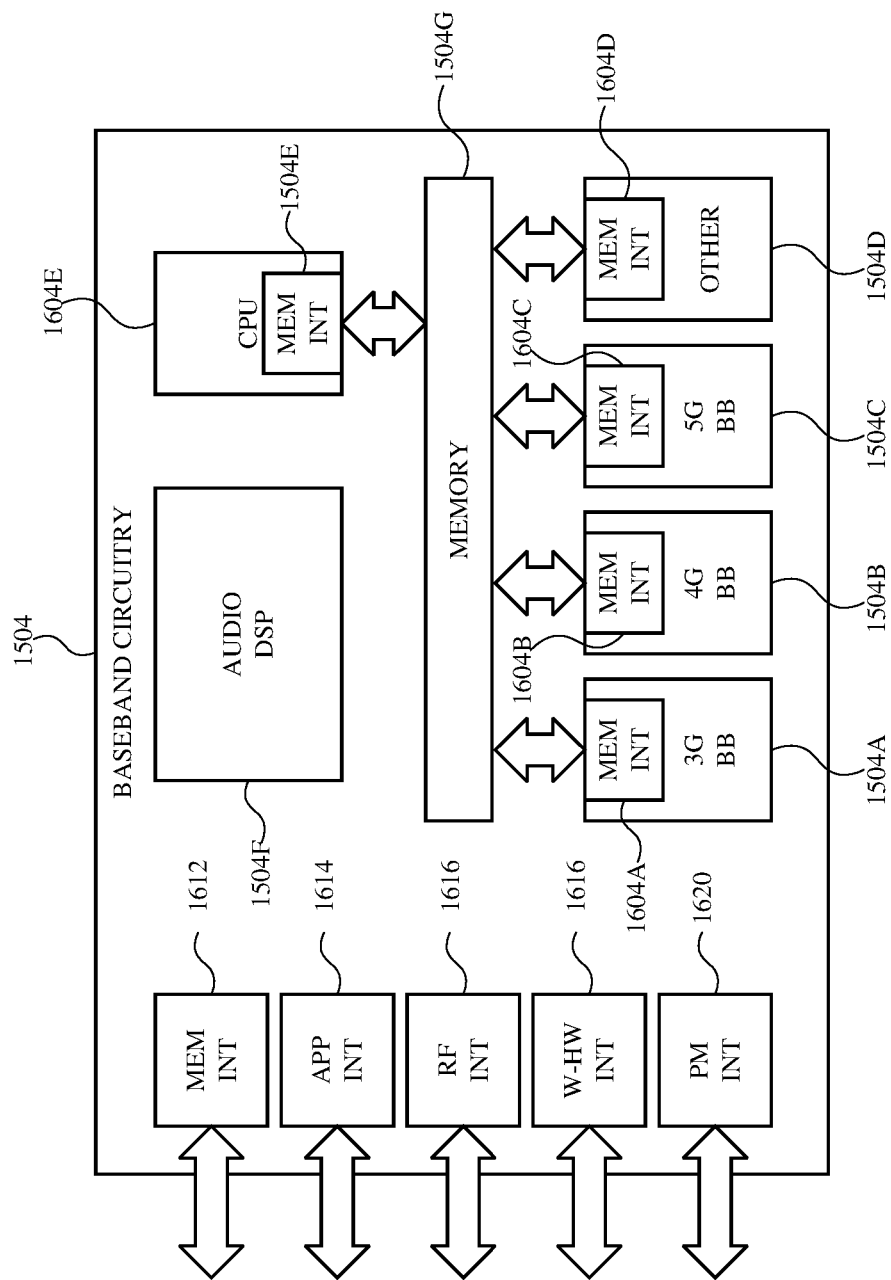
FIG. 16 illustrates example interfaces of baseband circuitry in accordance with some aspects.

FIG. 16 illustrates example interfaces of baseband circuitry in accordance with some aspects. As discussed above, the baseband circuitry 1504 of FIG. 2 can comprise processors 1504A-1504E and a memory 1504G utilized by said processors. Each of the processors 1504A-1504E can include a memory interface, 1604A-1604E, respectively, to send/receive data to/from the memory 1504G.

The baseband circuitry 1504 can further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 2), an RF circuitry interface 1616 (e.g., an interface to send/receive data to/from RF circuitry 1506 of FIG. 2), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512).

In various aspects, aspects discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an integrated circuit (IC) associated with a user equipment (UE), comprising one or more processors configured to process a service configuration signal received from a base station associated therewith, wherein the service configuration signal comprises an indication of one or more service configurations associated with a data transmission that are allowed to be transmitted by the UE during an INACTIVE state of the UE; and determine the one or more service configurations associated with the data transmission that are allowed to be transmitted by the UE during the INACTIVE state of the UE, based on processing the service configuration signal.

Example 2 is an IC, including the subject matter of example 1, wherein the one or more processors is configured to process an uplink (UL) data to be transmitted to the base station, during the INACTIVE state of the UE; determine one or more service configurations associated with a direct transmission of the UL data; and perform the direct transmission of the UL data to the base station, during the INACTIVE state of the UE, when the one or more service configurations associated with the direct transmission of the UL data comprise service configurations that are configured as part of the service configuration signal received from the base station.

Example 3 is an IC, including the subject matter of examples 1-2, including or omitting elements, wherein the one or more service configurations within the service configuration signal include one or more of an indication of a dedicated radio bearer (DRB) that is allowed to be transmitted in INACTIVE state, an indication whether radio resource control (RRC)/non-access stratum (NAS) is allowed to be transmitted in INACTIVE state, an indication whether paging triggered direct transmission is allowed in the INACTIVE state, an indication on which access category and access identity are allowed to be transmitted in the INACTIVE state and an indication on the Resume Cause(s) that are allowed to be transmitted in the INACTIVE state.

Example 4 is an IC, including the subject matter of examples 1-3, including or omitting elements, wherein, when the one or more service configurations associated with the direct transmission is not configured within the service configuration signal, the one or more processors is configured to transition the UE from the INACTIVE state to a CONNECTED state, in order to transmit the UL data to the base station.

Example 5 is an IC, including the subject matter of examples 1-4, including or omitting elements, wherein the one or more processors is configured to provide a radio resource control (RRC) resume request signal to the base station, in order to transition the UE from the INACTIVE state to the CONNECTED state.

Example 6 is an IC, including the subject matter of examples 1-5, including or omitting elements, wherein the service configuration signal is received via dedicated signaling or broadcast signaling from the base station.

Example 7 is a method for a user equipment (UE), comprising processing a service configuration signal received from a base station associated therewith, using one or more processors, wherein the service configuration signal comprises an indication of one or more service configurations associated with a data transmission that are allowed to be transmitted by the UE during an INACTIVE state of the UE; and determining the one or more service configurations associated with the data transmission that are allowed to be transmitted by the UE during the INACTIVE state of the UE, using the one or more processors, based on processing the service configuration signal.

Example 8 is a method, including the subject matter of example 7, further comprising processing an uplink (UL) data to be transmitted to the base station, during the INACTIVE state of the UE, using the one or more processors; determining one or more service configurations associated with a direct transmission of the UL data, using the one or more processors; and performing the direct transmission of the UL data to the base station, during the INACTIVE state of the UE, when the one or more service configurations associated with the direct transmission of the UL data comprise service configurations that are configured as part of the service configuration signal received from the base station, using the one or more processors.

Example 9 is a method, including the subject matter of examples 7-8, including or omitting elements, wherein the one or more service configurations within the service configuration signal include one or more of an indication of a dedicated radio bearer (DRB) that is allowed to be transmitted in INACTIVE state, an indication whether radio resource control (RRC)/non-access stratum (NAS) is allowed to be transmitted in INACTIVE state, an indication whether paging triggered direct transmission is allowed in the INACTIVE state, an indication on which access category and access identity are allowed to be transmitted in the INACTIVE state and an indication on the Resume Cause(s) that are allowed to be transmitted in the INACTIVE state.

Example 10 is a method, including the subject matter of examples 7-9, including or omitting elements, wherein, when the one or more service configurations associated with the direct transmission is not configured within the service configuration signal, the one or more processors is configured to transition the UE from the INACTIVE state to a CONNECTED state, in order to transmit the UL data to the base station.

Example 11 is a method, including the subject matter of examples 7-10, including or omitting elements, wherein the one or more processors is configured to provide a radio resource control (RRC) resume request signal to the base station, in order to transition the UE from the INACTIVE state to the CONNECTED state.

Example 12 is a method, including the subject matter of examples 7-11, including or omitting elements, wherein the service configuration signal is received via dedicated signaling or broadcast signaling from the base station.

Example 13 is a user equipment (UE), comprising one or more processors configured to generate a direct transmission signal to be provided to a base station, during an INACTIVE state of the UE, wherein the direct transmission signal comprises a first transmission comprising a first media access control (MAC) protocol data unit (PDU) of the direct transmission signal and wherein the first MAC PDU comprises access control information comprising one or more access control parameters associated with the direct transmission signal, in order to facilitate access control at the base station; and provide the first transmission associated with the direct transmission signal to the base station, during the INACTIVE state of the UE.

Example 14 is a UE, including the subject matter of example 13, wherein the access control information is included in an access control (AC) MAC control element (CE) within the first MAC PDU.

Example 15 is a UE, including the subject matter of examples 13-14, including or omitting elements, wherein the access control information comprises at least one of a Resume Cause and a priority.

Example 16 is a UE, including the subject matter of examples 13-15, including or omitting elements, wherein the one or more processors is further configured to perform a legacy resume procedure to transition the UE from the INACTIVE state to a CONNECTED state, in order to perform subsequent data transmissions, when the one or more processors do not receive an access control (AC) feedback signal from the base station within a predefined feedback time window, in response to providing the first transmission.

Example 17 is a UE, including the subject matter of examples 13-16, including or omitting elements, wherein the one or more processors is further configured to selectively receive a delay indication signal comprising a delay timer value from the base station, based on the network conditions, in response to providing the first transmission; start a delay timer with the delay time value, based on processing the delay indication signal; and stop any subsequent direct transmission to the base station in the INACTIVE state of the UE, until the delay timer expires.

Example 18 is a UE, including the subject matter of examples 13-17, including or omitting elements, wherein the one or more processors is further configured to selectively receive a fallback indication signal from the base station, based on the network conditions, in response to providing the first transmission to the base station, wherein the fallback indication signal indicates to the UE to fallback to a legacy resume procedure to transition the UE from the INACTIVE state to a CONNECTED state, in order to perform subsequent data transmissions.

Example 19 is a UE, including the subject matter of examples 13-18, including or omitting elements, wherein the one or more processors is further configured to selectively receive a radio resource control (RRC) resume/setup signal from the base station, in response to providing the first transmission to the base station, wherein the RRC resume/setup signal indicates the UE to transition from the INACTIVE state to the CONNECTED state, in order to perform subsequent data transmissions.

Example 20 is a UE, including the subject matter of examples 13-19, including or omitting elements, wherein the one or more processors is further configured to process a service configuration signal received from the base station, prior to generating the direct transmission signal, wherein the service configuration signal comprises an indication of one or more service configurations associated with a data transmission that are allowed to be transmitted by the UE during an INACTIVE state of the UE; and generate the direct transmission signal based thereon.

Example 21 is an integrated circuit associated with a user equipment (UE), comprising one or more processors configured to generate a direct transmission signal to be provided to a base station, during an INACTIVE state of the UE, wherein the direct transmission signal comprises a first transmission comprising a first media access control (MAC) protocol data unit (PDU) of the direct transmission signal and wherein the first MAC PDU comprises access control information comprising one or more access control parameters associated with the direct transmission signal, in order to facilitate access control at the base station; and provide the first transmission associated with the direct transmission signal to the base station, during the INACTIVE state of the UE.

Example 22 is an IC, including the subject matter of example 21, wherein the access control information is included in an access control (AC) MAC control element (CE) within the first MAC PDU.

Example 23 is an IC, including the subject matter of examples 21-22, including or omitting elements, wherein the access control information comprises at least one of a Resume Cause and a priority.

Example 24 is an IC, including the subject matter of examples 21-23, including or omitting elements, wherein the one or more processors is further configured to perform a legacy resume procedure to transition the UE from the INACTIVE state to a CONNECTED state, in order to perform subsequent data transmissions, when the one or more processors do not receive an access control (AC) feedback signal from the base station within a predefined feedback time window, in response to providing the first transmission.

Example 25 is an IC, including the subject matter of examples 21-24, including or omitting elements, wherein the one or more processors is further configured to selectively receive a delay indication signal comprising a delay timer value from the base station, based on the network conditions, in response to providing the first transmission; start a delay timer with the delay time value, based on processing the delay indication signal; and stop any subsequent direct transmission to the base station in the INACTIVE state of the UE, until the delay timer expires.

Example 26 is an IC, including the subject matter of examples 21-25, including or omitting elements, wherein the one or more processors is further configured to selectively receive a fallback indication signal from the base station, based on the network conditions, in response to providing the first transmission to the base station, wherein the fallback indication signal indicates to the UE to fallback to a legacy resume procedure to transition the UE from the INACTIVE state to a CONNECTED state, in order to perform subsequent data transmissions.

Example 27 is an IC, including the subject matter of examples 21-26, including or omitting elements, wherein the one or more processors is further configured to selectively receive a radio resource control (RRC) resume/setup signal from the base station, in response to providing the first transmission to the base station, wherein the RRC resume/setup signal indicates the UE to transition from the INACTIVE state to the CONNECTED state, in order to perform subsequent data transmissions.

Example 28 is an IC, including the subject matter of examples 21-27, including or omitting elements, wherein the one or more processors is further configured to process a service configuration signal received from the base station, prior to generating the direct transmission signal, wherein the service configuration signal comprises an indication of one or more service configurations associated with a data transmission that are allowed to be transmitted by the UE during an INACTIVE state of the UE; and generate the direct transmission signal based thereon.

Example 29 is a user equipment (UE), comprising one or more processors configured to provide a first transmission associated with a direct transmission signal to a base station, during an INACTIVE state of the UE, monitor one or more indicator signals received from the base station, in response to providing the first transmission, in order to determine whether the first transmission is successful; start a backoff timer with a backoff time value associated therewith, when it is determined that the first transmission is not successful; and delay any retransmission of the first transmission in the INACTIVE state of the UE, until the backoff timer expires.

Example 30 is a UE, including the subject matter of example 29, wherein the backoff timer has a backoff time value associated therewith, and wherein the backoff timer expires when a time equivalent to the backoff time value is passed.

Example 31 is a UE, including the subject matter of examples 29-30, including or omitting elements, wherein, when the first transmission is transmitted via a random access channel (RACH) procedure, the one or more processors is configured to determine the backoff time value based on an acquired backoff indicator within a random access response (RAR) associated with the RACH and a preconfigured special backoff parameter.

Example 32 is a UE, including the subject matter of examples 29-31, including or omitting elements, wherein the special backoff parameter is configured per dedicated radio bearer (DRB), per ResumeCause, per priority and per access identity associated with a data transmission.

Example 33 is a UE, including the subject matter of examples 29-32, including or omitting elements, wherein the one or more processors is configured to determine that the first transmission is not successful, based on the backoff indicator indicated as part of the RAR associated with the RACH.

Example 34 is a UE, including the subject matter of examples 29-33, including or omitting elements, wherein, when the first transmission is transmitted using a preconfigured grant, the first transmission is determined to be not successful, when an ACK feedback signal is not received from the base station during a predefined feedback window after the first transmission.

Example 35 is a UE, including the subject matter of examples 29-34, including or omitting elements, wherein, when the first transmission is transmitted using the preconfigured grant, the one or more processors is configured to determine the backoff timer value based on a backoff value that is acquired from a common channel during the predefined feedback window.

Example 36 is a UE, including the subject matter of examples 29-35, including or omitting elements, wherein, when the first transmission is transmitted using the preconfigured grant, the one or more processors is configured to determine the backoff timer value based on the acquired backoff value and a special backoff factor that is configured for each access category, ResumeCause, access identity, priority or dedicated radio bearer (DRB).

Example 37 is a UE, including the subject matter of examples 29-36, including or omitting elements, wherein, when the first transmission is transmitted using the preconfigured grant, the one or more processors is configured to determine the backoff timer value based on a predefined backoff value that is configured for each access category, ResumeCause, access identity, priority or dedicated radio bearer (DRB).

Example 38 is a UE, including the subject matter of examples 29-37, including or omitting elements, wherein the one or more processors is configured to perform one or more retransmissions of the first transmission in the INACTIVE state of the UE, after the backoff timer expires, until the UE receives an indication that a previous retransmission is successful or until a maximum retransmission number is reached, wherein the one or more processors identifies the first transmission as a failure when the maximum retransmission number is reached and the corresponding retransmission is not successful.

Example 39 is a UE, including the subject matter of examples 29-38, including or omitting elements, wherein, when the first transmission is identified as a failure, the one or more processors is configured to transition the UE from the INACTIVE state to a CONNECTED state.

Example 40 is a UE, including the subject matter of examples 29-39, including or omitting elements, wherein, when the first transmission is identified as a failure, the one or more processors is configured to start a second backoff timer with a predefined second backoff timer value and perform a next retransmission of the first transmission upon the expiry of the second backoff timer.

Example 41 is a UE, including the subject matter of examples 29-40, including or omitting elements, wherein the one or more processors is further configured to process a stop indication signal, received from the base station, in response to providing one or more direct transmissions including the first transmission to the base station, wherein the stop indication signal indicates the UE to start a stop timer having an associated stop time value during which any direct transmission from the UE in the INACTIVE state to the base station is to be stopped; start the stop timer; and stop any direct transmission from the UE in the INACTIVE state to the base station, until the stop timer is expired.

Example 42 is a UE, including the subject matter of examples 29-41, including or omitting elements, wherein, prior to providing the first transmission to the base station, the one or more processors is further configured to process a service configuration signal received from the base station, wherein the service configuration signal comprises an indication of one or more service configurations associated with a data transmission that are allowed to be transmitted by the UE during an INACTIVE state of the UE; and generate the direct transmission signal comprising the first transmission based thereon.

Example 43 is a UE, including the subject matter of examples 29-42, including or omitting elements, wherein the first transmission comprises a first media access control (MAC) protocol data unit (PDU) of the direct transmission signal and wherein the first MAC PDU comprises access control information comprising one or more access control parameters associated with the direct transmission signal, in order to facilitate access control at the base station.

Example 44 is method for a user equipment (UE), comprising providing a first transmission associated with a direct transmission signal to a base station, during an INACTIVE state of the UE, using one or more processors, monitoring one or more indicator signals received from the base station, in response to providing the first transmission, using the one or more processors, in order to determine whether the first transmission is successful; starting a backoff timer with a backoff time value associated therewith, using the one or more processors, when it is determined that the first transmission is not successful; and delaying any retransmission of the first transmission in the INACTIVE state of the UE, until the backoff timer expires, using the one or more processors.

Example 45 is a method, including the subject matter of example 44, wherein the backoff timer has a backoff time value associated therewith, and wherein the backoff timer expires when a time equivalent to the backoff time value is passed.

Example 46 is a method, including the subject matter of examples 44-45, including or omitting elements, wherein, when the first transmission is transmitted via a random access channel (RACH) procedure, the one or more processors is configured to determine the backoff time value based on an acquired backoff indicator within a random access response (RAR) associated with the RACH and a preconfigured special backoff parameter.

Example 47 is a method, including the subject matter of examples 44-46, including or omitting elements, wherein the special backoff parameter is configured per dedicated radio bearer (DRB), per ResumeCause, per priority and per access identity associated with a data transmission.

Example 48 is a method, including the subject matter of examples 44-47, including or omitting elements, wherein the one or more processors is configured to determine that the first transmission is not successful, based on the backoff indicator indicated as part of the RAR associated with the RACH.

Example 49 is a method, including the subject matter of examples 44-48, including or omitting elements, wherein, when the first transmission is transmitted using a preconfigured grant, the first transmission is determined to be not successful, when an ACK feedback signal is not received from the base station during a predefined feedback window after the first transmission.

Example 50 is a method, including the subject matter of examples 44-49, including or omitting elements, wherein, when the first transmission is transmitted using the preconfigured grant, the one or more processors is configured to determine the backoff timer value based on a backoff value that is acquired from a common channel during the predefined feedback window.

Example 51 is a method, including the subject matter of examples 44-50, including or omitting elements, wherein, when the first transmission is transmitted using the preconfigured grant, the one or more processors is configured to determine the backoff timer value based on the acquired backoff value and a special backoff factor that is configured for each access category, ResumeCause, access identity, priority or dedicated radio bearer (DRB).

Example 52 is a method, including the subject matter of examples 44-51, including or omitting elements, wherein, when the first transmission is transmitted using the preconfigured grant, the one or more processors is configured to determine the backoff timer value based on a predefined backoff value that is configured for each access category, ResumeCause, access identity, priority or dedicated radio bearer (DRB).

Example 53 is a method, including the subject matter of examples 44-52, including or omitting elements, further comprising performing one or more retransmissions of the first transmission in the INACTIVE state of the UE, after the backoff timer expires, until the UE receives an indication that a previous retransmission is successful or until a maximum retransmission number is reached, wherein the one or more processors identifies the first transmission as a failure when the maximum retransmission number is reached and the corresponding retransmission is not successful.

Example 54 is a method, including the subject matter of examples 44-53, including or omitting elements, further comprising transitioning the UE from the INACTIVE state to a CONNECTED state, using the one or more processors, when the first transmission is identified as a failure.

Example 55 is a method, including the subject matter of examples 44-54, including or omitting elements, further comprising starting a second backoff timer with a predefined second backoff timer value and performing a next retransmission of the first transmission upon the expiry of the second backoff timer, when the first transmission is identified as a failure.

Example 56 is a method, including the subject matter of examples 44-55, including or omitting elements, further comprising processing a stop indication signal, received from the base station, in response to providing one or more direct transmissions including the first transmission to the base station, wherein the stop indication signal indicates the UE to start a stop timer having an associated stop time value during which any direct transmission from the UE in the INACTIVE state to the base station is to be stopped; starting the stop timer; and stopping any direct transmission from the UE in the INACTIVE state to the base station, until the stop timer is expired.

Example 57 is a method, including the subject matter of examples 44-56, including or omitting elements, further comprising processing a service configuration signal received from the base station, using the one or more processors, wherein the service configuration signal comprises an indication of one or more service configurations associated with a data transmission that are allowed to be transmitted by the UE during an INACTIVE state of the UE; and generating the direct transmission signal comprising the first transmission based thereon, using the one or more processors, prior to providing the first transmission to the base station.

Example 58 is a method, including the subject matter of examples 44-57, including or omitting elements, wherein the first transmission comprises a first media access control (MAC) protocol data unit (PDU) of the direct transmission signal and wherein the first MAC PDU comprises access control information comprising one or more access control parameters associated with the direct transmission signal, in order to facilitate access control at the base station.

Example 59 is an apparatus configured to be employed in a base station, comprising one or more processors configured to generate a service configuration signal to be provided to a UE associated therewith, wherein the service configuration signal comprises an indication of one or more service configurations associated with a data transmission that are allowed to be transmitted by the UE during an INACTIVE state of the UE; and provide the service configuration signal to the UE.

Example 60 is an apparatus, including the subject matter of example 59, wherein the one or more service configurations within the service configuration signal include one or more of an indication of a dedicated radio bearer (DRB) that is allowed to be transmitted in INACTIVE state, an indication whether radio resource control (RRC)/non-access stratum (NAS) is allowed to be transmitted in INACTIVE state, an indication whether paging triggered direct transmission is allowed in the INACTIVE state, an indication on which access category and access identity are allowed to be transmitted in the INACTIVE state and an indication on the Resume Cause(s) that are allowed to be transmitted in the INACTIVE state.

Example 61 is an apparatus, including the subject matter of examples 59-60, including or omitting elements, wherein the one or more processors is further configured to process a direct transmission of the UL data, received from the UE during the INACTIVE state of the UE, wherein one or more service configurations associated with the direct transmission comprise service configurations that are configured as part of the service configuration signal.

Example 62 is an apparatus, including the subject matter of examples 59-61, including or omitting elements, wherein the direct transmission of the UL data is received from the UE in the INACTIVE state as part of a random access channel (RACH) procedure.

Example 63 is an apparatus, including the subject matter of examples 59-62, including or omitting elements, wherein the direct transmission of the UL data is received from the UE in the INACTIVE state on a preconfigured grant.

Example 64 is an apparatus, including the subject matter of examples 59-63, including or omitting elements, wherein the service configuration signal comprises a dedicated signal to the UE.

Example 65 is an apparatus, including the subject matter of examples 59-64, including or omitting elements, wherein the service configuration signal comprises a broadcast signal.

Example 66 is a method for a base station, comprising generating a service configuration signal to be provided to a UE associated therewith, using one or more processors, wherein the service configuration signal comprises an indication of one or more service configurations associated with a data transmission that are allowed to be transmitted by the UE during an INACTIVE state of the UE; and providing the service configuration signal to the UE, using the one or more processors.

Example 67 is a method, including the subject matter of example 66, wherein the one or more service configurations within the service configuration signal include one or more of an indication of a dedicated radio bearer (DRB) that is allowed to be transmitted in INACTIVE state, an indication whether radio resource control (RRC)/non-access stratum (NAS) is allowed to be transmitted in INACTIVE state, an indication whether paging triggered direct transmission is allowed in the INACTIVE state, an indication on which access category and access identity are allowed to be transmitted in the INACTIVE state and an indication on the Resume Cause(s) that are allowed to be transmitted in the INACTIVE state.

Example 68 is a method, including the subject matter of examples 66-67, including or omitting elements, further comprising processing a direct transmission of the UL data, received from the UE during the INACTIVE state of the UE, using the one or more processors, wherein one or more service configurations associated with the direct transmission comprise service configurations that are configured as part of the service configuration signal.

Example 69 is a method, including the subject matter of examples 66-68, including or omitting elements, wherein the direct transmission of the UL data is received from the UE in the INACTIVE state as part of a random access channel (RACH) procedure.

Example 70 is a method, including the subject matter of examples 66-69, including or omitting elements, wherein the direct transmission of the UL data is received from the UE in the INACTIVE state on a preconfigured grant.

Example 71 is a method, including the subject matter of examples 66-70, including or omitting elements, wherein the service configuration signal comprises a dedicated signal to the UE.

Example 72 is a method, including the subject matter of examples 66-71, including or omitting elements, wherein the service configuration signal comprises a broadcast signal.

Example 73 is a base station, comprising one or more processors configured to receive a first transmission associated with a direct transmission signal from a user equipment (UE) during an INACTIVE state of the UE, wherein the first transmission comprises a first media access control (MAC) protocol data unit (PDU) of the direct transmission signal and wherein the first MAC PDU comprises access control information comprising one or more access control parameters associated with the direct transmission signal; process the first transmission associated with the direct transmission signal; and control subsequent direct transmissions from the UE in the INACTIVE state of the UE, based on the access control information within the first transmission or network conditions, or both.

Example 74 is a base station, including the subject matter of example 73, wherein the access control information is included in an access control (AC) MAC control element (CE) within the first MAC PDU.

Example 75 is a base station, including the subject matter of examples 73-74, including or omitting elements, wherein the access control information comprises at least one of a Resume Cause and a priority.

Example 76 is a base station, including the subject matter of examples 73-75, including or omitting elements, wherein the one or more processors is configured to not provide an access control (AC) feedback signal to the UE during a predefined AC feedback time window, in response to processing the first transmission, based on the access control information within the first transmission or network conditions, or both, in order to reject subsequent data transmissions from the UE in the INACTIVE state of the UE.

Example 77 is a base station, including the subject matter of examples 73-76, including or omitting elements, wherein the one or more processors is configured to selectively provide a delay indication signal comprising a delay timer value to the UE, based on the access control information within the first transmission or network conditions, or both, wherein the delay indication signal indicates to the UE to delay a subsequent direct transmission in the INACTIVE state of the UE, to the base station, by the delay timer value.

Example 78 is a base station, including the subject matter of examples 73-77, including or omitting elements, wherein the one or more processors is configured to selectively provide a fallback indication signal to the UE, based on the access control information within the first transmission or network conditions, or both, wherein the fallback indication signal indicates to the UE to fallback to a legacy resume procedure, in order to transition the UE from the INACTIVE state to a CONNECTED state.

Example 79 is a base station, including the subject matter of examples 73-78, including or omitting elements, wherein the one or more processors is configured to selectively provide a radio resource control (RRC) resume/setup signal to the UE, based on the access control information within the first transmission or network conditions, or both, wherein the RRC resume/setup signal indicates the UE to transition from the INACTIVE state to the CONNECTED state.

Example 80 is a base station, including the subject matter of examples 73-79, including or omitting elements, wherein the one or more processors is configured to provide a service configuration signal to the UE, prior to receiving the first transmission associated with the direct transmission signal from the UE during the INACTIVE state of the UE, wherein the service configuration signal comprises an indication of one or more service configurations associated with a data transmission that are allowed to be transmitted by the UE during the INACTIVE state of the UE.

Example 81 is an apparatus configured to be employed in a base station, comprising one or more processors configured to receive a first transmission associated with a direct transmission signal from a user equipment (UE) during an INACTIVE state of the UE, wherein the first transmission comprises a first media access control (MAC) protocol data unit (PDU) of the direct transmission signal and wherein the first MAC PDU comprises access control information comprising one or more access control parameters associated with the direct transmission signal; process the first transmission associated with the direct transmission signal; and control subsequent direct transmissions from the UE in the INACTIVE state of the UE, based on the access control information within the first transmission or network conditions, or both.

Example 82 is an apparatus, including the subject matter of example 81, wherein the access control information is included in an access control (AC) MAC control element (CE) within the first MAC PDU.

Example 83 is an apparatus, including the subject matter of examples 81-82, including or omitting elements, wherein the access control information comprises at least one of a Resume Cause and a priority.

Example 84 is an apparatus, including the subject matter of examples 81-83, including or omitting elements, wherein the one or more processors is configured to not provide an access control (AC) feedback signal to the UE during a predefined AC feedback time window, in response to processing the first transmission, based on the access control information within the first transmission or network conditions, or both, in order to reject subsequent data transmissions from the UE in the INACTIVE state of the UE.

Example 85 is an apparatus, including the subject matter of examples 81-84, including or omitting elements, wherein the one or more processors is configured to selectively provide a delay indication signal comprising a delay timer value to the UE, based on the access control information within the first transmission or network conditions, or both, wherein the delay indication signal indicates to the UE to delay a subsequent direct transmission in the INACTIVE state of the UE, to the base station, by the delay timer value.

Example 86 is an apparatus, including the subject matter of examples 81-85, including or omitting elements, wherein the one or more processors is configured to selectively provide a fallback indication signal to the UE, based on the access control information within the first transmission or network conditions, or both, wherein the fallback indication signal indicates to the UE to fallback to a legacy resume procedure, in order to transition the UE from the INACTIVE state to a CONNECTED state.

Example 87 is an apparatus, including the subject matter of examples 81-86, including or omitting elements, wherein the one or more processors is configured to selectively provide a radio resource control (RRC) resume/setup signal to the UE, based on the access control information within the first transmission or network conditions, or both, wherein the RRC resume/setup signal indicates the UE to transition from the INACTIVE state to the CONNECTED state.

Example 88 is an apparatus, including the subject matter of examples 81-87, including or omitting elements, wherein the one or more processors is configured to provide a service configuration signal to the UE, prior to receiving the first transmission associated with the direct transmission signal from the UE during the INACTIVE state of the UE, wherein the service configuration signal comprises an indication of one or more service configurations associated with a data transmission that are allowed to be transmitted by the UE during the INACTIVE state of the UE.

Example 89 is a base station, comprising one or more processors configured to process one or more direct transmissions associated with a direct transmission signal from a user equipment (UE) during an INACTIVE state of the UE, determine whether to allow a subsequent direct transmission from the UE in the INACTIVE state, based on network conditions; and provide a stop indication signal to the UE, when it is determined not to allow the subsequent direct transmission from the UE in the INACTIVE state, wherein the stop indication signal indicates the UE to start a stop timer having an associated stop time value during which any direct transmission from the UE in the INACTIVE state to the base station is to be stopped.

Example 90 is a base station, including the subject matter of example 89, wherein, when a first transmission of the direct transmission signal cannot be successfully processed at the base station, the one or more processors is configured to provide an indication to the UE that the first transmission is not successful.

Example 91 is a base station, including the subject matter of examples 89-90, including or omitting elements, wherein, when the first transmission is performed via a random access channel (RACH), the one or more processors is configured to provide the indication to the UE that the first transmission is not successful, based on a backoff indicator (BI) within a random access response (RAR) message associated therewith.

Example 92 is a base station, including the subject matter of examples 89-91, including or omitting elements, wherein a first transmission of the direct transmission signal comprises a first media access control (MAC) protocol data unit (PDU) of the direct transmission signal and wherein the first MAC PDU comprises access control information comprising one or more access control parameters associated with the direct transmission signal.

Example 93 is a base station, including the subject matter of examples 89-92, including or omitting elements, wherein the one or more processors is further configured to provide a service configuration signal to the UE, prior to processing the one or more direct transmissions associated with the direct transmission signal from the UE, wherein the service configuration signal comprises one or more service configurations associated with a data transmission that are allowed to be transmitted by the UE during an INACTIVE state of the UE.

Example 94 is a method for a base station, comprising processing one or more direct transmissions associated with a direct transmission signal from a user equipment (UE) during an INACTIVE state of the UE, using one or more processors, determining whether to allow a subsequent direct transmission from the UE in the INACTIVE state, based on network conditions, using the one or more processors; and providing a stop indication signal to the UE, when it is determined not to allow the subsequent direct transmission from the UE in the INACTIVE state, using the one or more processors, wherein the stop indication signal indicates the UE to start a stop timer having an associated stop time value during which any direct transmission from the UE in the INACTIVE state to the base station is to be stopped.

Example 95 is a method, including the subject matter of example 94, further comprising providing an indication to the UE that the first transmission is not successful, when a first transmission of the direct transmission signal cannot be successfully processed at the base station.

Example 96 is a method, including the subject matter of examples 94-95, including or omitting elements, wherein, when the first transmission is performed via a random access channel (RACH), the one or more processors is configured to provide the indication to the UE that the first transmission is not successful, based on a backoff indicator (BI) within a random access response (RAR) message associated therewith.

Example 97 is a method, including the subject matter of examples 94-96, including or omitting elements, wherein a first transmission of the direct transmission signal comprises a first media access control (MAC) protocol data unit (PDU) of the direct transmission signal and wherein the first MAC PDU comprises access control information comprising one or more access control parameters associated with the direct transmission signal.

Example 98 is a method, including the subject matter of examples 94-97, including or omitting elements, further comprising providing a service configuration signal to the UE, prior to processing the one or more direct transmissions associated with the direct transmission signal from the UE, wherein the service configuration signal comprises one or more service configurations associated with a data transmission that are allowed to be transmitted by the UE during an INACTIVE state of the UE.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

What is claimed is:

1. A baseband (BB) processor for a base station configured to, when executing instructions stored in a memory, perform operations comprising:
    providing, to a radio frequency (RF) interface for transmission to a user equipment (UE), a service configuration signal including an indication of whether radio resource control (RRC)/non-access stratum (NAS) signaling is allowed to be transmitted by the UE during an INACTIVE state of the UE;
    receiving a direct transmission signal from the UE during the INACTIVE state of the UE, wherein the direct transmission signal comprises one or more access control parameters including a Resume Cause;
    controlling subsequent direct transmissions from the UE during the INACTIVE state of the UE based on the one or more access control parameters; and
    receiving an uplink (UL) transmission as one of the subsequent direct transmissions from the UE during the INACTIVE state of the UE, wherein the UL transmission comprises the RRC/NAS signaling indicated in the service configuration signal.

2. The BB processor of claim 1, wherein the service configuration signal further includes an indication of one or more data radio bearers (DRBs) for which data is allowed to be transmitted by the UE during the INACTIVE state of the UE.

3. The BB processor of claim 1, wherein the UL transmission is received from the UE during the INACTIVE state as part of a random access channel (RACH) procedure.

4. The BB processor of claim 1, wherein the UL transmission is received from the UE during the INACTIVE state on preconfigured physical uplink shared channel (PUSCH) resources.

5. The BB processor of claim 4, wherein the preconfigured PUSCH resources include type 1 configured grant resources.

6. The BB processor of claim 1, wherein the service configuration signal comprises a dedicated signal to the UE.

7. A baseband (BB) processor for a base station configured to, when executing instructions stored in a memory, perform operations comprising:
    receiving a direct transmission signal from a user equipment (UE) during an INACTIVE state of the UE, wherein the direct transmission signal comprises one or more access control parameters including a Resume Cause; and controlling subsequent direct transmissions from the UE during the INACTIVE state of the UE based on the one or more access control parameters.

8. The BB processor of claim 7, wherein the one or more access control parameters are included in an access control (AC) medium access control (MAC) control element (CE) within a MAC protocol data unit (PDU).

9. The BB processor of claim 7, wherein the one or more access control parameters further include a priority level.

10. The BB processor of claim 7, wherein the operations further comprise:
not providing an access control (AC) feedback signal to the UE during a predefined AC feedback time window, based on the one or more access control parameters, in order to reject subsequent data transmissions from the UE during the INACTIVE state of the UE.

11. The BB processor of claim 7, wherein the operations further comprise:
providing, to a radio frequency (RF) interface for transmission to the UE, a delay indication signal comprising a delay timer value, based on the one or more access control parameters;
wherein the delay indication signal indicates to the UE to delay a subsequent direct transmission to the base station during the INACTIVE state of the UE by the delay timer value.

12. The BB processor of claim 7, wherein the operations further comprise:
providing, to a radio frequency (RF) interface for transmission to the UE, a fallback indication signal, based on the one or more access control parameters;
wherein the fallback indication signal indicates to the UE to fallback to a legacy resume procedure in order to transmit a subsequent direct transmission to the base station.

13. The BB processor of claim 7, wherein the operations further comprise:
providing, to a radio frequency (RF) interface for transmission to the UE, a radio resource control (RRC) resume/setup signal to transition the UE from the INACTIVE state to a CONNECTED state, based on the one or more access control parameters.

14. The BB processor of claim 7, wherein the operations further comprise:
providing, prior to receiving the direct transmission signal from the UE, a service configuration signal to a radio frequency (RF) interface for transmission to the UE;
wherein the service configuration signal comprises an indication of one or more types of services for which data is allowed to be transmitted by the UE during the INACTIVE state of the UE.

15. The BB processor of claim 7, wherein controlling the subsequent direct transmissions from the UE during the INACTIVE state of the UE includes allowing or rejecting the subsequent direct transmissions based on the one or more access control parameters.

16. A baseband (BB) processor for a base station configured to, when executing instructions stored in a memory, perform operations comprising:
receiving one or more direct transmissions associated with a direct transmission signal from a user equipment (UE) during an INACTIVE state of the UE,
determining to not allow a subsequent direct transmission from the UE during the INACTIVE state of the UE, based on network conditions; and
providing, to a radio frequency (RF) interface for transmission to the UE, a stop indication signal, in response to the determination to not allow the subsequent direct transmission from the UE during the INACTIVE state of the UE, wherein the stop indication signal indicates the UE to start a stop timer having an associated stop time value during which any direct transmission from the UE in the INACTIVE state to the base station is to be stopped.

17. The BB processor of claim 16, wherein the operations further comprise:
in response to a first transmission of the direct transmission signal not being successfully received at the base station, providing an indication to the UE that the first transmission was not successful.

18. The BB processor of claim 17, wherein, when the first transmission is performed via a random access channel (RACH), and wherein the operations further comprise:
providing the indication to the UE that the first transmission was not successful, based on a backoff indicator (BI) within a random access response (RAR) message associated therewith.

19. The BB processor of claim 16, wherein a first transmission of the direct transmission signal comprises a first medium access control (MAC) protocol data unit (PDU) including one or more access control parameters associated with the direct transmission signal.

20. The BB processor of claim 16, wherein the operations further comprise:
providing, to a radio frequency (RF) interface for transmission to the UE, a service configuration signal, prior to receiving the one or more direct transmissions associated with the direct transmission signal from the UE, wherein the service configuration signal includes an indication of one or more types of services for which data is allowed to be transmitted by the UE during the INACTIVE state of the UE.

* * * * *